(12) United States Patent
Sharifi Mehr

(10) Patent No.: US 10,346,190 B1
(45) Date of Patent: Jul. 9, 2019

(54) INTERPROCESS SEGMENTATION IN VIRTUAL MACHINE ENVIRONMENTS

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/181,313

(22) Filed: Jun. 13, 2016

(51) Int. Cl.
*G06F 9/455* (2018.01)
*H04L 12/26* (2006.01)
*H04L 12/751* (2013.01)

(52) U.S. Cl.
CPC .......... *G06F 9/45558* (2013.01); *H04L 43/14* (2013.01); *H04L 45/02* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,421,698 B2 * | 9/2008 | Fresko | ................... | G06F 9/4843 718/104 |
| 7,467,219 B2 * | 12/2008 | Hodges | ................... | H04L 29/06 375/E7.013 |
| 8,588,749 B1 * | 11/2013 | Sadhvani | ................. | H04M 1/24 379/1.01 |
| 8,606,929 B2 * | 12/2013 | Hodges | ................... | H04L 29/06 709/227 |
| 8,880,034 B2 * | 11/2014 | Sadhvani | ................. | H04M 1/24 379/1.01 |
| 9,135,048 B2 * | 9/2015 | Klein | ................... | G06F 9/45558 |
| 9,294,351 B2 * | 3/2016 | Mittal | ................... | G06F 9/45558 |
| 9,323,577 B2 * | 4/2016 | Marr | ................... | G06F 9/5044 |
| 2005/0138623 A1 * | 6/2005 | Fresko | ................... | G06F 9/4843 718/102 |
| 2005/0144304 A1 * | 6/2005 | Hodges | ................... | H04L 29/06 709/231 |
| 2013/0125112 A1 * | 5/2013 | Mittal | ................. | G06F 9/45558 718/1 |
| 2014/0066020 A1 * | 3/2014 | Sadhvani | ................. | H04M 1/24 455/411 |
| 2015/0007173 A1 | 1/2015 | Ionescu et al. | | |
| 2015/0043379 A1 | 2/2015 | Shimokuni et al. | | |
| 2015/0288569 A1 | 10/2015 | Agarwal et al. | | |
| 2016/0359705 A1 | 12/2016 | Parandehgheibi et al. | | |

* cited by examiner

*Primary Examiner* — Van H Nguyen
(74) *Attorney, Agent, or Firm* — Davis Wright Tremaine LLP

(57) ABSTRACT

Techniques for segmenting an application are described herein. Communication events for an application are received. A segmentation profile for the application, which includes a set of processes, is generated based on patterns in the communication events. The segmentation profile includes two or more disjoint sets of processes of the application. Communications between processes in the two or more disjoint sets of processes are restricted by updating a communication profile for each process in the disjoint sets of processes.

23 Claims, 19 Drawing Sheets ical machine network. Monitoring the virtual machine network provides the system with data used to determine communications between the applications and between the processes in the applications. When an application is being segmented, a system monitors the virtual machine instance upon which the application is operating and/or the communications with and within the application to and from other applications. Monitoring the virtual machine instance provides the system with data used to determine communications between the applications. When the processes within an application are being segmented, the system monitors the communications both within and outside of the application. Monitoring the application provides data used to determine communications between processes.

INTERPROCESS SEGMENTATION IN VIRTUAL MACHINE ENVIRONMENTS

CROSS-REFERENCE TO RELATED APPLICATIONS

This application incorporates by reference for all purposes the full disclosure of co-pending U.S. patent application Ser. No. 15/181,295, filed concurrently herewith, entitled "VIRTUAL NETWORK SEGMENTATION."

BACKGROUND

Modern computer systems are frequently implemented as virtual computer systems operating collectively on one or more host computer systems. These virtual computer systems may utilize resources of host computer systems such as processors, memory, network interfaces, storage services, and other host computer system resources. These virtual computer systems may also include software applications configured to operate on the virtual computer systems, which may utilize these resources to perform functionality on behalf of users of the virtual computer systems. Virtual networks hosting virtual machine instances are often used to separate virtual machine instances from other virtual machine instances operating within the same computer system in order to increase security and reduce resource interdependencies. Applications or modules operating on such virtual machine instances are also often typically isolated from other applications or modules to increase security and reduce resource interdependencies.

Virtual networks hosting such virtual machine instances often provide mechanisms to further segment a virtual network to produce subnetworks, thus isolating virtual machine instances or isolating applications or parts of applications. One approach to this problem is to manually define the segmentation and to manually configure the routing rules for intercommunication between the instances, the applications, and/or the parts of the applications. However, in the case of a large or complex virtual computer system with many instances, applications, resources, virtual networks, and internal and/or external dependencies, such manual definition and configuration can be very complex and can require very detailed knowledge of the system. Failure to accurately define and configure the segmentation can lead to various issues, such as blocked communications and degraded user experience.

BRIEF DESCRIPTION OF THE DRAWINGS

Various techniques will be described with reference to the drawings, in which.

DETAILED DESCRIPTION

Figure 1:
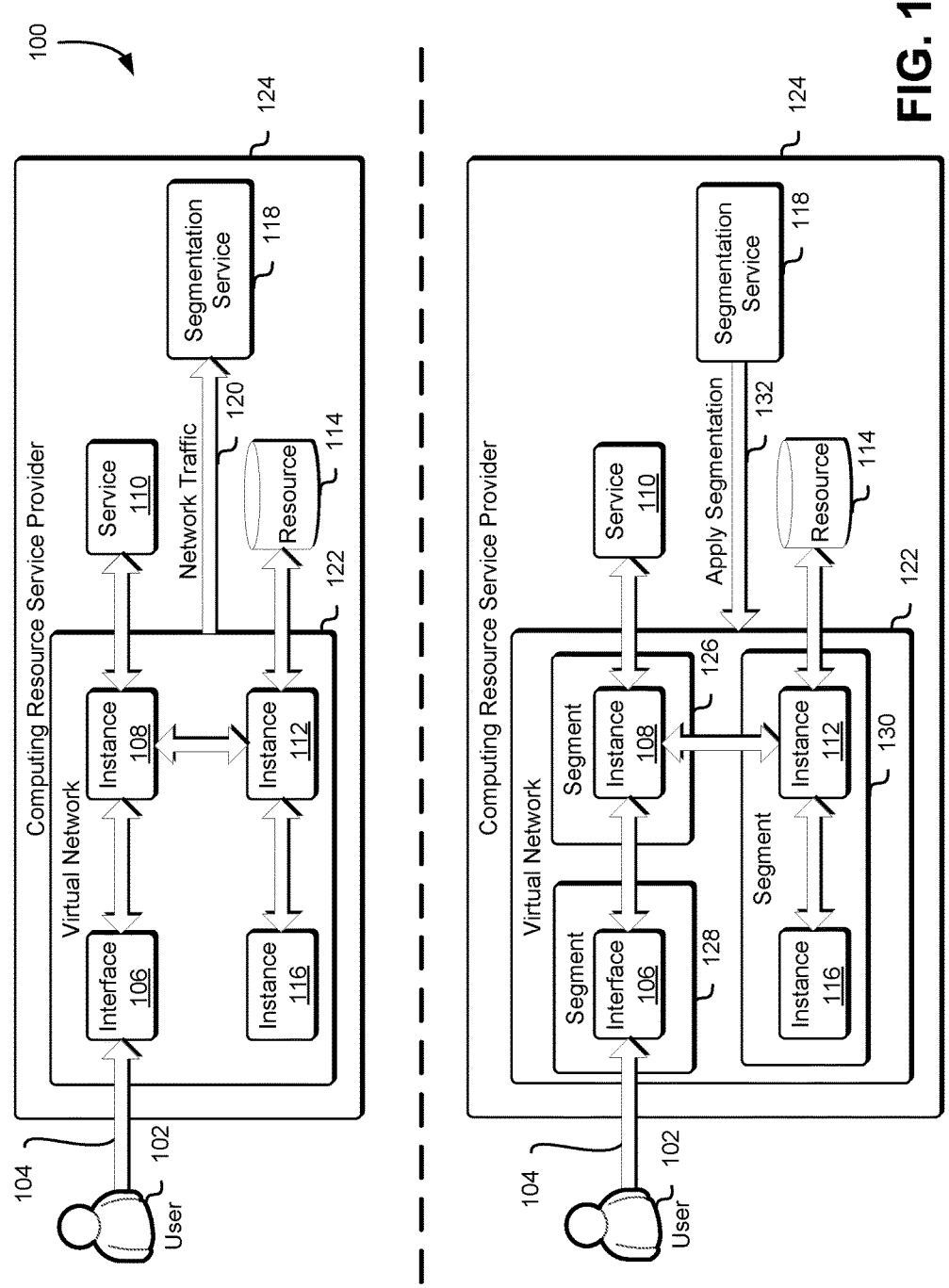
FIG. 1 illustrates an example environment where a virtual network is segmented.

This disclosure relates to methods for facilitating the segmentation of virtual networks, virtual machine instances, or of applications to produce isolated segments. Such isolated segments can then be used to provide a security defense at a variety of levels such as, for example, the subnetwork level, the instance level, the application level, or the process level. Virtual networks that host virtual machine instances often provide mechanisms to segment virtual networks to segments (i.e., subnetworks or "subnets"). These mechanisms provide a security defense at the network level and isolate virtual instances that do not require regular or constant communications with each or that only require the ability to communicate through a restricted set of interfaces. Segmentations may also occur within an instance (e.g., by segmenting different applications) or even within an application or module (e.g., by segmenting different processes). However, administrators must manually define the network segments and the routing rules for any intercommunication both between and within the segments. This manual configuration may require detailed knowledge about the systems and/or their interdependencies and external dependencies. As the size and complexity of the computer systems increase, the effort and knowledge required for implementing the segmentation may increase rapidly.

Techniques described in the present disclosure facilitate the process of segmenting virtual networks, virtual machine instances, and applications, minimizing the manual work and the required knowledge based on knowledge acquired from the system by monitoring the communications and dependencies between various entities. In order to facilitate such segmentation, a system first monitors the communications between the various entities in the computer system. For example, when a virtual network is being segmented, a system monitors the network traffic flow in a virtual network. Monitoring the virtual machine network provides the system with data used to determine communications between the instances, services, and resources both within and outside of the virtual network. When a virtual machine instance is being segmented, a system monitors the virtual machine instance. Monitoring the virtual machine instance provides the system with data used to determine communications between applications or modules within, as well as communications to resources or services outside of the virtual machine instance. When an application or module is being segmented, a system may monitor the application to determine communications between processes of the application, as well as communications to other applications and/or to resources or services outside of the virtual machine instance.

After the communications have been analyzed, the virtual machine instances, applications, or processes are grouped into clusters according to similar traffic patterns. For example, a set of virtual machine instances that may typically only communicate with each other can be clustered together. Similarly, a virtual machine instance that implements an interface to a service are separated from other instances (i.e., placed in its own "cluster") to facilitate isolation of the interface. After each cluster is determined, the interdependencies (i.e., the dependencies within the cluster) and the external dependencies (i.e., the dependencies between the cluster and other clusters, external services, and/or external resources) are determined. The interdependencies and/or the external dependencies are used to further refine the clusters so that, for example, clusters are further segmented or clusters are joined together.

These clusters, interdependencies, and external dependencies are then used to build a set of initial segmentations of the virtual network, the virtual machine instance, or the application or module. Each of the initial segmentations are presented as a proposal to a network owner or administrator who may implement the proposal. Each of the initial segmentations may also be used to generate a segmentation profile (i.e., a set of configurations and/or routing tables) that is used to segment the virtual network, the virtual machine instance, or the application. Further monitoring of the virtual network, the virtual machine instance, or the application may then be performed to update and refine the segmentation. Updating and refining the segmentation may be performed by, for example, testing the new segmentation in a test mode or environment, by implementing the new segmentation in a permissive mode (i.e., by allowing violating communications and logging such violations), or by implementing the new segmentation in a permissive mode for a restrictive amount of time.

Segmentations of a virtual network, a virtual machine instance, or an application or module may also be selected based at least in part on other factors. For example, a network or system administrator may have a more secure (but less permissive) segmentation for a system and a less secure (but more permissive) segmentation. During certain times of the day (e.g., during normal work hours) the less secure segmentation may be used for the system, and during other times of the day (e.g., at night, when there are fewer users), the more secure segmentation may be used for the system. Similarly, when secure or sensitive data is present in the system in plaintext form (e.g., customer data), a more secure segmentation may be used for the system requiring, for example, two-factor authentication for access to any of the services or virtual machine instances with access to that data. Combinations of such factors may also be used to select segmentations such as when, for example, a data upload occurs daily, weekly, monthly, etc.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a virtual network is segmented in accordance with an embodiment. In the example illustrated in FIG. 1, a user 102 may access 104 an interface 106 operating within a virtual network 122 provided by a computing resource service provider 124. The interface 106 may be implemented as a web interface which may be provided by a virtual machine instance running within the virtual network 122 provided by the computing resource service provider 124. The computing resource service provider 124 may, for example, provide a distributed, virtualized, and/or datacenter environment within which one or more applications, processes, services, virtual machines, and/or other such computer system entities are executed. The user 102 may be a person, or may be a process running on one or more remote computer systems, or may be some other computer system entity, user, or process.

The user 102 may use a client computing device to access 104 the interface 106 within the virtual network 122 provided by the computing resource service provider 124. The connection used to access 104 the interface 106 may be made via a network such as those described herein. Commands from the user 102 to the computing resource service provider 124 may originate from an outside computer system or from within the computing resource service provider environment. The commands to connect to the computing resource service provider 124 may be sent to the interface 106, without the intervention of the user 102 (i.e., commands to connect to the interface 106 may be generated automatically in response to one or more events). The user 102 may be a privileged user associated with a customer of the computing resource service provider 124 (e.g., an administrator). The user 102 may also be a privileged user associated with the computing resource service provider 124.

The computing resource service provider 124 may provide access to one or more host machines, as well as provide access to one or more virtual machine instances running on those host machines within virtual networks as described herein. One or more services provided by the computing resource service provider 124 may also be implemented as and/or may utilize one or more virtual machine instances operating on the host machines. For example, the computing resource service provider 124 may provide a variety of services to users including, but not limited to, the user 102, and the users may communicate with the computing resource service provider 124 via the interface 106. While the example environment illustrated in FIG. 1 shows a single connection to the computing resource service provider 124, a plurality of interfaces such as the interface 106 may exist to allow users such as the user 102 to access 104 a plurality of virtual networks such as the virtual network 122.

In an example, a virtual computer system may be a collection of computing resources configured to instantiate one or more new virtual machine instances (e.g., a first instance 108) on behalf of a user such as the user 102. The user 102 may interact with a virtual computer system service (via appropriately configured and authenticated API requests) to provision and operate virtual machine instances within virtual networks such as the virtual network 122. The virtual machine instances with the virtual networks may be instantiated on physical computing devices hosted and operated by the computing resource service provider 124. The virtual computer system service may also be configured to manage virtual machine instances to, for example, instantiate new virtual machine instances and/or to manage the migration of virtual machine instances hosted by the computing resource service provider 124. The virtual machine instances may be used for various purposes, such as to operate as servers supporting a web site, to operate business applications or, generally, to serve as computing power for the customer. Other applications for the virtual machine instances may support database applications, electronic commerce applications, business applications, and/or other applications.

Within the virtual network (also referred to herein as a "virtual private network"), in the example illustrated in FIG. 1, the interface 106 is connected to a first virtual machine instance (also referred to herein as an "instance"). The interface 106 is connected to the first instance 108 using, for example, network connections within the virtual network 122. The first instance 108 may provide a portion of the functionality provided to the user 102 by a service, module, application, or collection of processes. For example, the interface 106 may be a web interface to a payment processing system, and the first instance 108 may provide functionality to receive payment processing requests from the user 102 via the interface 106 and to provide the initial processing of those requests.

In the example illustrated in FIG. 1, the first instance 108 is connected to a second instance 112 that is also within the virtual network 122. As described above, the first instance 108 is connected to the second instance 112 using, for example, network connections within the virtual network 122. This second instance 112 may provide another portion of the functionality provided to the user 102 by a service, module, application, or collection of processes. Using the payment processing example from above, the second instance 112 may receive the processed payment processing requests from the first instance 108 and may, for example, encrypt or de-identify those requests for further processing.

In the example illustrated in FIG. 1, the first instance 108 is also connected to a service 110 that is outside of (also referred to herein as "external" to) the virtual network. The first instance 108 is connected to the service 110 using, for example, network connections within the virtual network 122, network connections and/or interfaces provided by the computing resource service provider 124 to the virtual network 122, or a combination of these and/or other network connections. Again considering the payment processing example from above, the service 110 may receive the processed payment processing requests from the first instance 108 and may process the requests for payment.

In the example illustrated in FIG. 1, the second instance 112 is connected to a third instance 116 that is also within the virtual network 122. As described above, the second instance 112 is connected to the third instance 116 using, for example, network connections within the virtual network 122. The third instance 116 may provide another portion of the functionality provided to the user 102 by a service, module, application, or collection of processes. Continuing with the payment processing example from above, the third instance 116 may receive the encrypted payment processing requests from the second instance 112 and may, for example, further process those encrypted payment processing requests.

In the example illustrated in FIG. 1, the second instance 112 is also connected to a resource 114 that is outside of the virtual network. The second instance 112 is connected to the resource 114 using, for example, network connections within the virtual network 122, network connections, and/or interfaces provided by the computing resource service provider 124 to the virtual network 122, or a combination of these and/or other network connections. The resource 114 may be, for example, a storage resource, a network resource, a database resource, or some other such resource. Again considering the payment processing example from above, the resource 114 may receive the processed payment processing requests from the second instance 112 and may log the requests for payment. As may be contemplated, the payment process example described herein is merely an illustrative example of the functionality provided to the user 102 by a service, module, application, or collection of processes, and other such functionality may be considered as within the scope of the present disclosure.

Each of the network communications described above (e.g., the connection between the user 102 and the interface 106, the connection between the interface 106 and the first instance 108, the connection between the first instance 108 and the service 110, the connection between the first instance 108 and the second instance 112, the connection between the second instance 112 and the third instance 116, and/or the connection between the second instance 112 and the resource 114) may produce network traffic 120 which is analyzed by a segmentation service 118 to segment the virtual network 122 as described herein.

The segmentation service 118 may then analyze the network traffic 120 and use the network traffic information (also referred to herein as "network flow data") to determine a segmentation profile for the virtual network 122. In an illustrative example, the interface 106 may have a network address (e.g., an Internet Protocol ("IP") address) within the virtual network 122, and each of the first instance 108, the second instance 112, and the third instance 116 may also have a network address. Communications between, for example, the interface 106 and the first instance 108, will produce network flow data entries at least specifying both the network address of the interface 106 (i.e., the source network address) and the network address of the first instance 108 (i.e., the destination network address). The presence of such network flow data indicates the presence of a connection between the interface 106 and the first instance 108, which may be used in determining a segmentation of the virtual network 122. Conversely, since there is no connection between the interface 106 and the third instance 116, there may not be any network flow data entries specifying both the network address of the interface 106 and the network address of the third instance 116. This lack of network flow data entries may indicate the lack of a connection between the interface 106 and the third instance 116 which may also be used to in determining a segmentation of the virtual network 122.

It should be noted that, as used herein, a "segmentation" of a virtual network (or, as described below, a segmentation of the processes of an application or a set of applications) that produces a segmented virtual network, produces a set of subsets of the set of instances in the virtual network where each subset of the set of instances is disjoint from the others. In other words, each instance is in exactly one subset. Consider, for example, a set of instances {A, B, C, D, E, F, G}. One segmentation of this set of instances is the four subsets {A, B}, {C, D, E}, {F}, and {G} because each instance is in exactly one subset. These four subsets are disjoint subsets. Conversely, the four subsets {A, B}, {C, D}, {F}, and {G} is not a segmentation of the set because the instance "E" is not any subset. Similarly, the four subsets {A, B}, {C, D, E}, {F, G}, and {G} is not a segmentation of the set because the instance "G" is in two subsets and so these four subsets are not disjoint subsets. As used herein, sets, subsets, groups, and other collections of instances, processes, applications, or modules may be described as "disjoint" to indicate that they conform to this property.

In the example illustrated in FIG. 1, the segmentation service 118 uses the network traffic 120 to produce a segmentation of the virtual network 122. When the segmentation service 118 applies the segmentation 132, the resulting segmentation adds a first segment 128 isolating the interface 106, a second segment 126 isolating the first instance 108, and a third segment 130 isolating the second instance 112 and the third instance 116. The third segment 130 has grouped (also referred to herein as "clustered") the second instance 112 and the third instance 116 because of, for example, the nature or frequency of the communications between the second instance 112 and the third instance 116. Different segmentations of the virtual network 122 may be produced by the segmentation service 118 based on the network traffic 120. For example, the third segment 130 may be further segmented to produce one segment for the second instance 112 and a different segment for third instance 116. In another example, a segment may be produced that clusters the first instance 108 and the second instance 112 together since, for example, both have external communications with services and resources external to the virtual network 122. As may be contemplated, the segmentations of the virtual network 122 described herein are merely illustrative examples, and other such segmentations may be considered as within the scope of the present disclosure.

Figure 2:
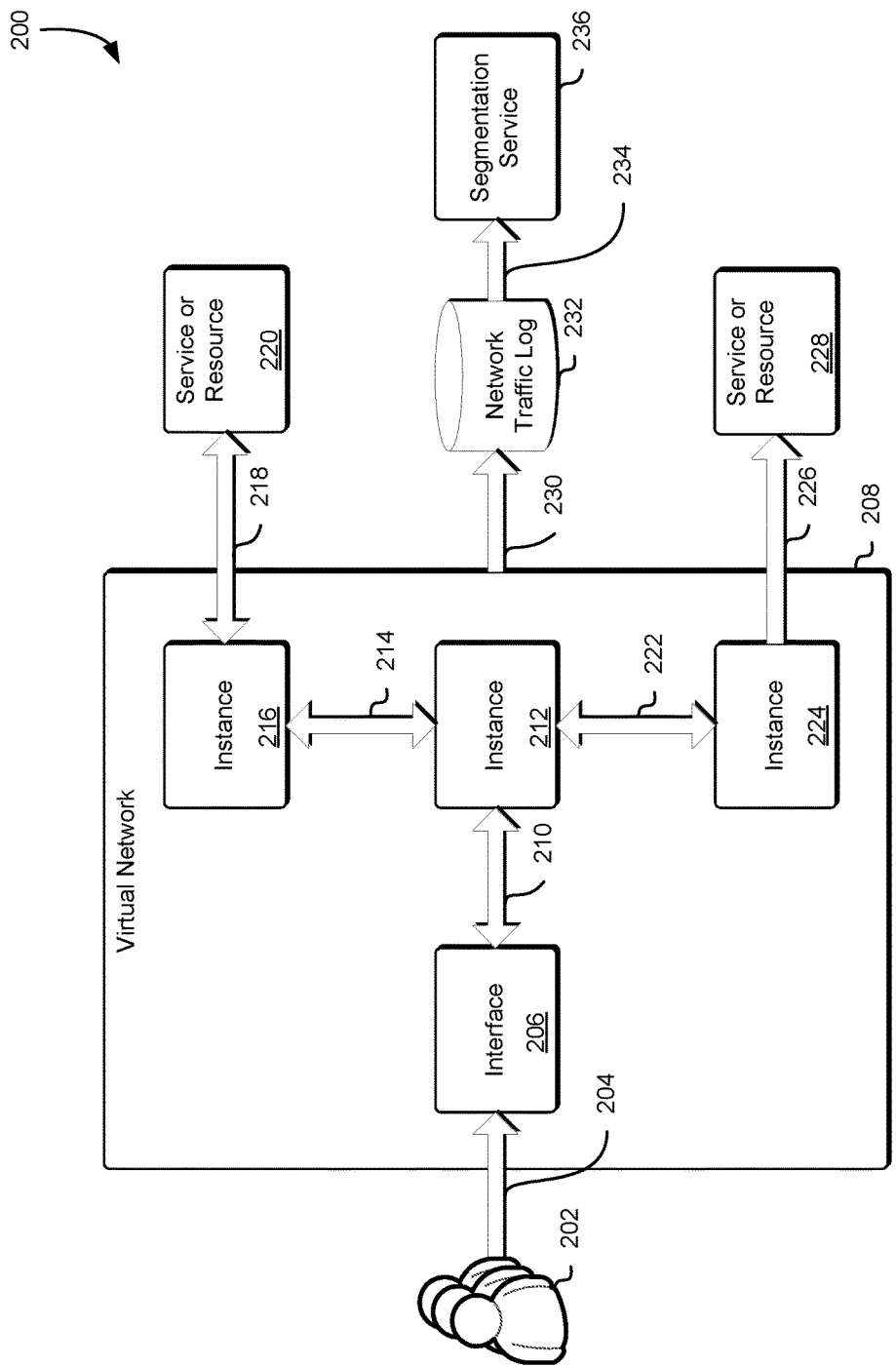
FIG. 2 illustrates an example environment where a virtual network is analyzed for segmentation.

FIG. 2 illustrates an example environment 200 where a virtual network is analyzed for segmentation as described in connection with FIG. 1 and in accordance with an embodiment. In the example illustrated in FIG. 2, a plurality of users 202 may connect 204 to an interface 206 within a virtual network 208 as described above. For each connection, one or more network traffic data entries are created that specifies a connection between a network address associated with each of the users and the network address of the interface 206. The network traffic data entries may also specify, for example, the internet service provider ("ISP") of the user, the country of origin of the user, whether the user is using a proxy network or an anonymizer service, or other such network data and/or metadata.

One or more network traffic data entries may be created based at least in part on connections 210 between the interface 206 and a first instance 212, connections 214 between the first instance 212 and a second instance 216, or connections 222 between the first instance 212 and a third instance 224. Each of these network traffic data entries may include a source network address of one of the instances within the virtual network 208 and may also include a destination network address of another one of the instances within the virtual network 208.

Similarly, one or more network traffic data entries is created based at least in part on connections 218 between the second instance 216 and a service or resource 220 that is outside of the virtual network 208 and/or connections 226 between the third instance 224 and a service or resource 228 that is outside of the virtual network 208. Each of these network traffic data entries may include a source network address of, for example, one of the instances within the virtual network 208 and may also include a destination network address that is not within the virtual network 208. In an embodiment, the destination network address may be a network address within the computing resource service provider environment, or may be a network address outside of the computing resource service provider environment.

Each of the one or more network traffic data entries may be stored 230 in a network traffic log 232, the contents of which is provided 234 to a segmentation service 236 for analysis and processing of the data and/or metadata associated with the network traffic data entries. For example, the connections 204 to the interface 206 may be analyzed to determine a range and/or type of network addresses of the users 202. In another example, the connections 214 between the first instance 212 and the second instance 216 may be analyzed to determine network traffic patterns between these two instances. The network traffic patterns may be determined based on one or more shared characteristics of the connection including, but not limited to, times of peak traffic, times of low traffic, the type of connection, the bandwidth used, the type of data sent across the connection, or other network traffic data and/or metadata. Similarly, the connections 226 between the third instance 224 and the service or resource 228 may be analyzed to determine, for example, the type and nature of the connection or the network location of the service or resource 228.

Figure 3:
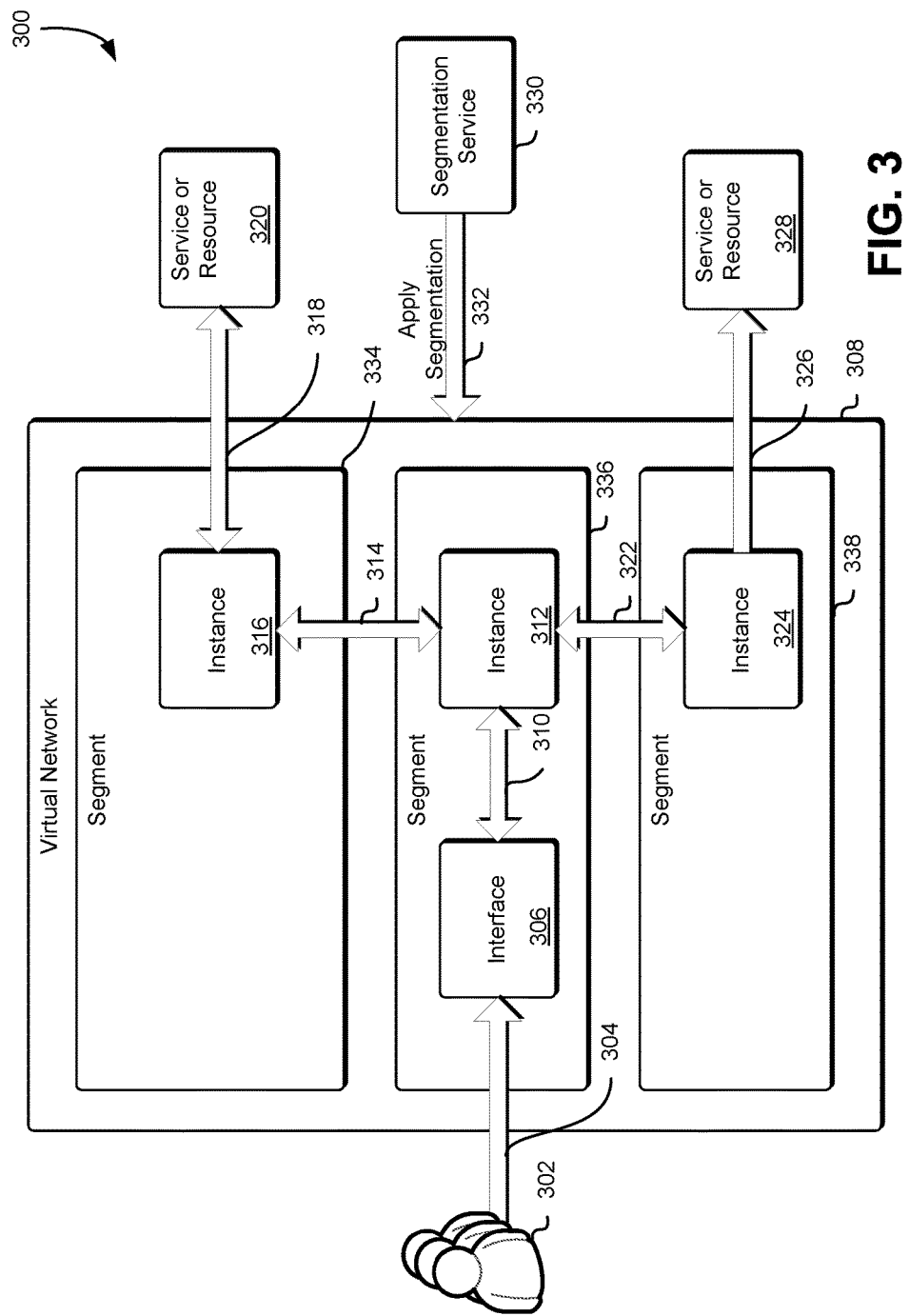
FIG. 3 illustrates an example environment where a virtual network is segmented.

FIG. 3 illustrates an example environment 300 where a virtual network is segmented as described in connection with FIG. 1 and in accordance with an embodiment. The example illustrated in FIG. 3 is a segmentation of the virtual network 208 (also referred to herein as a "segmented network" or a "segmented virtual network") described in connection with FIG. 2. In the example illustrated in FIG. 3, a plurality of users 302 may connect 304 to an interface 306 within a virtual network 308. Communications 310 between the interface 306 and a first instance 312, connections 314 between the first instance 312 and a second instance 316, and connections 322 between the first instance 312 and a third instance 324 may also exist within the virtual network 308 as described above. Additionally, connections 318 between the second instance 316 and a service or resource 320 that is outside of the virtual network 308 and connections 326 between the third instance 324 and a service or resource 328 that is outside of the virtual network 308 may also exist as described above.

A segmentation service 330 may use network traffic data entries such as the network traffic data entries stored in the network traffic log 232 described above in connection with FIG. 2 to create a segmentation of the virtual network and apply 332 the segmentation. In the example illustrated in FIG. 3, the interface 306 and the first instance 312 are clustered in the first segment 336, the second instance 316 is clustered in the second segment 334, and the third instance 324 is clustered in the third segment 338. The segmentation is applied by, for example, changing network addresses of the instances and/or interfaces in the virtual network 308.

For example, the first segment 336, the second segment 334, and the third segment 338 may be subnetworks of the virtual network 308. In an example, the virtual network 308 may have an range of virtual network addresses from 10.0.0.1 to 10.0.255.255 and, prior to segmentation, the interface 306 may have a network address of 10.0.0.1, the first instance may have a network address of 10.0.0.2, the second instance may have a network address of 10.0.0.3, and the third instance may have a network address of 10.0.0.4. In applying a segmentation of the virtual network 308, the first segment 336 may be assigned a subnetwork of 10.0.1.1 to 10.0.1.255, the second segment 334 may be assigned a subnetwork of 10.0.2.1 to 10.0.2.255, and the third segment 338 may be assigned a subnetwork of 10.0.3.1 to 10.0.3.255. As a result of this segmentation, the interface 306 may be assigned a new network address of 10.0.1.1 and the first instance 312 may be assigned a new network address of 10.0.1.2, the second instance 316 may be assigned a new network address of 10.0.2.1, and the third instance 324 may be assigned a new network address of 10.0.3.1. In this example, the subnet mask of the first segment (e.g., 10.0.1.255) may then be used to allow communications 310 within the segment between the interface 306 and the first instance 312 but restrict other communications between, for example, the interface 306 and the second instance 316.

As described herein, each of the segments may be further updated based on additional network traffic data entries such as, for example, the network traffic data entries stored in the network traffic log 232 described above in connection with FIG. 2. For example, the second segment 334 and the third segment 338 may be joined together (also referred to herein as "clustered together") based on a commonality of the connection between the instances inside the virtual network 308 and the services or resources outside of the virtual network 308. Similarly, the first segment 336 may be further segmented to isolate the interface 306 and the first instance 312, so that, for example, the interface 306 is assigned to one subnet and the first instance 312 is assigned to a different subnet.

Figure 4:
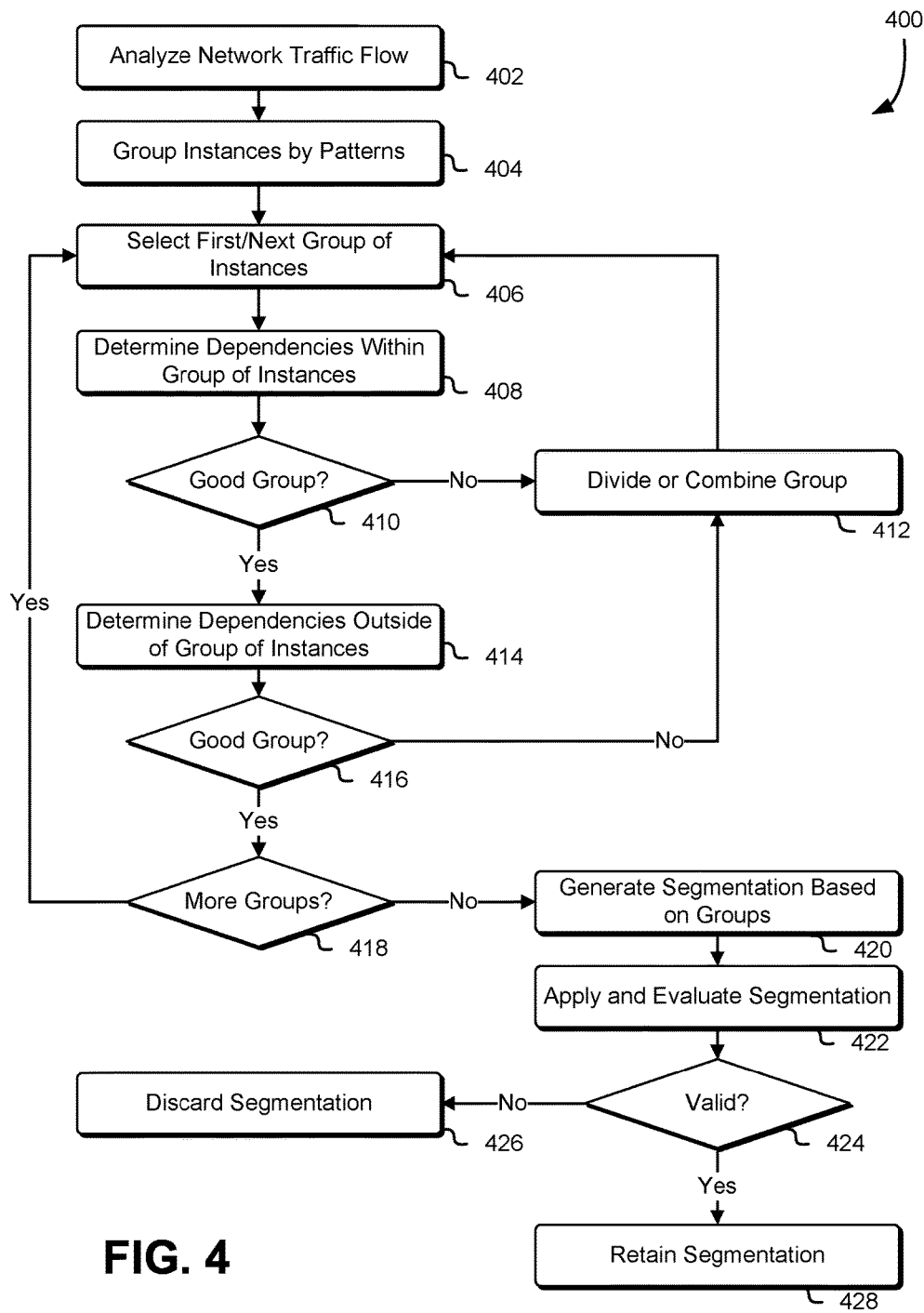
FIG. 4 illustrates an example process for analyzing and segmenting a virtual network.

FIG. 4 illustrates an example process 400 for analyzing and segmenting a virtual network as described in connection with FIG. 1 and in accordance with an embodiment. A segmentation service such as the segmentation service 118 described in connection with FIG. 1 may perform the example process 400 illustrated in FIG. 4. The segmentation service may first analyze 402 network traffic flow from, for example, a network traffic log as described above. The segmentation service may then group instances 404 by patterns in the network traffic flow. For example, a pattern of regular network connections between a pair of virtual machine instances in a virtual network may cause the segmentation service to place the pair of virtual machine instances into the same group or cluster.

The segmentation service may then begin selecting 406 groups of instances for analysis. First, the segmentation service may analyze the instances and the network traffic to determine 408 dependencies between instances within the group of instances. Using the aforementioned example, the pattern of regular network connections between the pair of virtual machine instances may indicate a dependency between those two instances because, for example, the two instances consistently share functionality between them. Based on the determined dependencies, the segmentation service may then determine 410 whether or not the group is a good group. The segmentation service may determine 410 that the group is a good group if the instances in the group have, for example, consistent and regular communications between them and few communications to other instances not in the group.

If the segmentation service does not determine 410 that the group is a good group, the segmentation service may then either divide 412 the group or combine one or more instances in the group with instances in other groups to improve the grouping. Again, such decisions on whether to divide 412 the group or combine one or more instances in the group with instances in other groups may be based at least in part on the dependencies between the instances in the group and/or on the network traffic flow.

If the segmentation service does determine 410 that the group is a good group, the segmentation service may then analyze the instances and the network traffic to determine 414 dependencies between instances within the group of instances and instances, services, or resources outside the group of instances. Using the aforementioned example, a pattern of regular network connections between a virtual machine instance in the group and a virtual machine instance, service, or resource outside of the group may indicate an external dependency of the group. Based on the determined external dependencies, the segmentation service may again determine 416 whether or not the group is a good group. If the segmentation service does not determine 416 that the group is a good group, the segmentation service may again either divide 412 the group or combine one or more instances in the group with instances in other groups to improve the grouping.

When there are no more groups 418 to analyze, the segmentation service may then generate 420 a segmentation of the virtual network based at least in part on the finalized groups and may then apply and evaluate the segmentation 422. If the segmentation service determines 424 that the segmentation is valid, the segmentation service may retain 428 the segmentation. Conversely, if the segmentation service determines 424 that the segmentation is not valid, then the segmentation service may discard 426 some or all of the segmentation. In an embodiment, the segmentation is evaluated without applying it. For example, a segmentation profile and/or the list of changes to an existing segmentation is analyzed but not automatically applied. The segmentation may also be applied in a test network as described herein and that test network used to evaluate the segmentation before applying it to a production network.

One method for evaluating the segmentation to determine whether it is valid is to test the segmentation in a simulated testbed. In order to avoid network connection outages in a production system because of a segmentation change, the segmentation service may monitor a virtual network used in integration tests (i.e., a test virtual network) that is configured for use in build and deployment pipelines. If a change in segmentation is identified in the test virtual network, any deployment to production virtual network will be flagged as conditional on, for example, further testing.

Another method for evaluating the segmentation is to implement the proposed segmentation in a production system and evaluate the segmentation for blocked communications attempts. For example, if a test virtual network and integration tests are not available or not indicative of exact behaviors in production network, then the segmentation service may monitor the build and deployment pipeline and after deployment of a new segmentation, the network segmentation will be deployed in a permissive mode (i.e., traffic blockages may not be enforced and instead they may simply be logged as violations of network traffic flow rules). Such permissive mode may continue for a limited time window (e.g., two hours after each deployment). If, after this limited time permissive mode of operation, no violation is detected, then the segmentation service may finalize the segmentation, take the virtual network out of permissive mode, and enforce network blockages.

Figure 5:
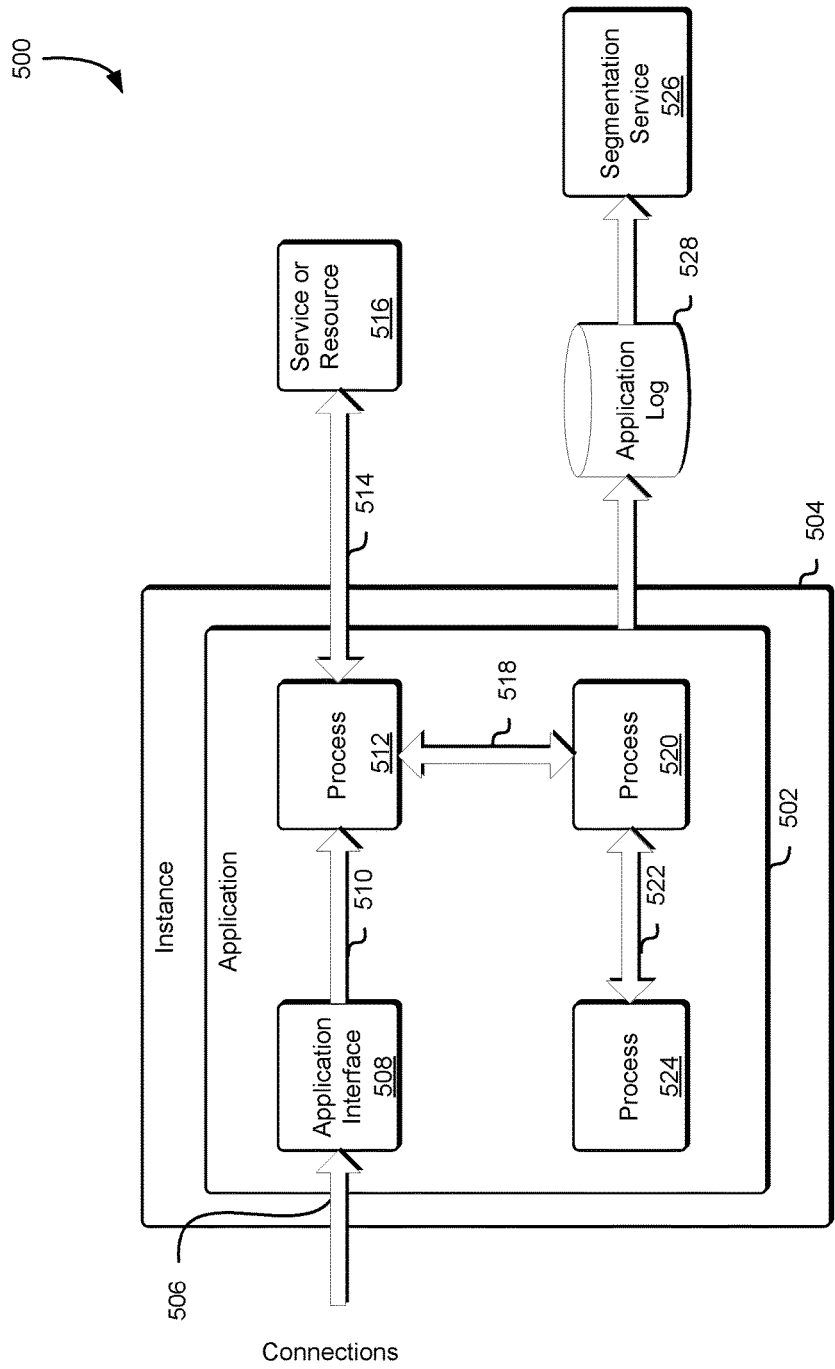
FIG. 5 illustrates an example environment where an application is analyzed for segmentation.

FIG. 5 illustrates an example environment 500 where an application is analyzed for segmentation in accordance with an embodiment. An application 502 running on an instance 504 may include an application interface 508, a first process 512, a second process 520, and a third process 524. The application 502 may be a module, a service, a group of processes, or some other application. Data and/or metadata of the connections 506 into the application interface 508 is logged in an application log 528, which may store the source of the connection, the destination of the connection, or other data and/or metadata associated with the connection. For example, data and/or metadata of the connections 506 into the application interface 508 may include network addresses of the connection, may include methods used to make the connection (e.g., application programming interface ("API") calls), or may include other data and/or metadata associated with the connection. The data and/or metadata in the application log 528 may be provided for analysis and processing by a segmentation service 526. The segmentation service 526 may be the same as the segmentation service 118 described in connection with FIG. 1, or may be a separate segmentation service configured for analysis of applications.

Data and/or metadata of the connections 510 between the application interface 508 and the first process 512 may also be logged in the application log 528, which may also store the source, the destination, or other data and/or metadata of the connection. The source and destination between the application interface 508, which may be a process of the application 502 and the first process 512 may be determined from interprocess communications (based on, for example, interprocess communication event notifications), from monitoring the application 502, from monitoring the instance 504, or using some other method of monitoring interprocess communications (also referred to herein as "interprocess communication events"). Each network communication event (also referred to herein as a "communication event") and each interprocess communication event (i.e., the interprocess communication events and also the external process communication events described below) has a corresponding communication event notification that may include a description of the event or reference the event (i.e., provide a location where the event can be found). Internal communication events (described herein) have corresponding internal event communication event notifications. External communications events (also described herein) also have corresponding external communication event notifications.

In the example illustrated in FIG. 5, the first process 512 has a connection 514 to a service or resource 516 that is outside of the instance. This service or resource 516 may be a service or resource such as those described above. Data and/or metadata of the connections 514 between the first process 512 and the service or resource 516 may also be logged in the application log 528. As the service or resource 516 may be a distributed service or resource provided by a computing resource service provider (e.g., a distributed block storage service), the destination of the connection 514 between the first process 512 and the service or resource 516 may include a plurality of destinations.

Data and/or metadata of additional connections (e.g., the connections 518 between the first process 512 and the second process 520 as well as the connections 522 between the second process 520 and the third process 524) may also be logged in the application log 528 as described above. In an embodiment, additional data and/or metadata of the application is also logged in the application log 528 for analysis and processing by the segmentation service 526 including, but not limited to, data and/or metadata of privileges granted to the application or process, resources associated with the application or process, or networks connected to the instance that hosts the application or instance.

Figure 6:
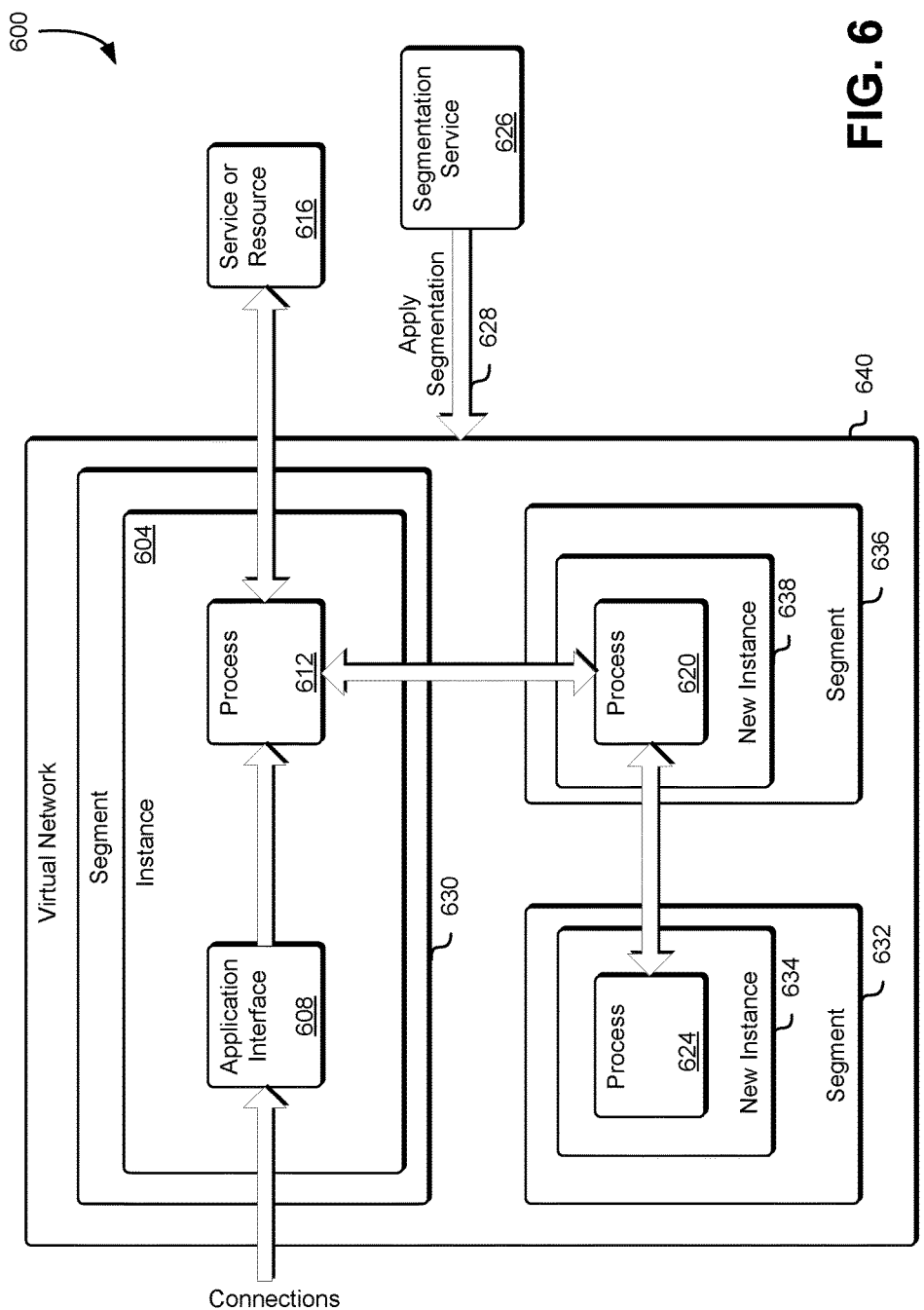
FIG. 6 illustrates an example environment where new instances are added to segment an application.

FIG. 6 illustrates an example environment 600 where new instances are added to segment an application as described in connection with FIG. 5 and in accordance with an embodiment. In the example illustrated in FIG. 6, an application running on an instance includes an application interface 608 (corresponding to the first process 512 described in connection with FIG. 5), a first process 612 (corresponding to the first process 512 described in connection with FIG. 5), a second process 620 (corresponding to the second process 520 described in connection with FIG. 5), and a third process 624 (corresponding to the third process 524 described in connection with FIG. 5). The first process 612 also includes a connection to a service or resource 616 (corresponding to the service or resource 516 described in connection with FIG. 5) that is outside of the instance.

In the example illustrated in FIG. 6, the segmentation service 626 applies 628 the segmentation to the application based at least in part on the data and/or metadata in the application log as described above. The segmentation is generated by instantiating new instances in segments (e.g., subnets) of a virtual network 640 as described above. The instance 604 hosts the application interface 608 and the first process 612 in segment 630. The first new instance 638 hosts the second process 620 in segment 636. The second new instance 634 hosts the third process 624 in segment 632. In the example illustrated in FIG. 6, the instance 604 is the same as the instance 504 described in connection with FIG. 5. In an embodiment, the instance 604 may be a new instance in the segment 630, with the application interface 608 and the first process 612 having been migrated to the instance 604 as a result of the segmentation. The example segmentation illustrated in FIG. 6 is an example segmentation of the application and, as such, other segmentations of the application may be produced by the segmentation service. For example, the application interface 608 and the first process 612 may be clustered into separate segments, the first process 612 and the second process 620 may be clustered into the same segment, or the second process 620 and the third process 624 may be clustered into the same segment.

Figure 7:
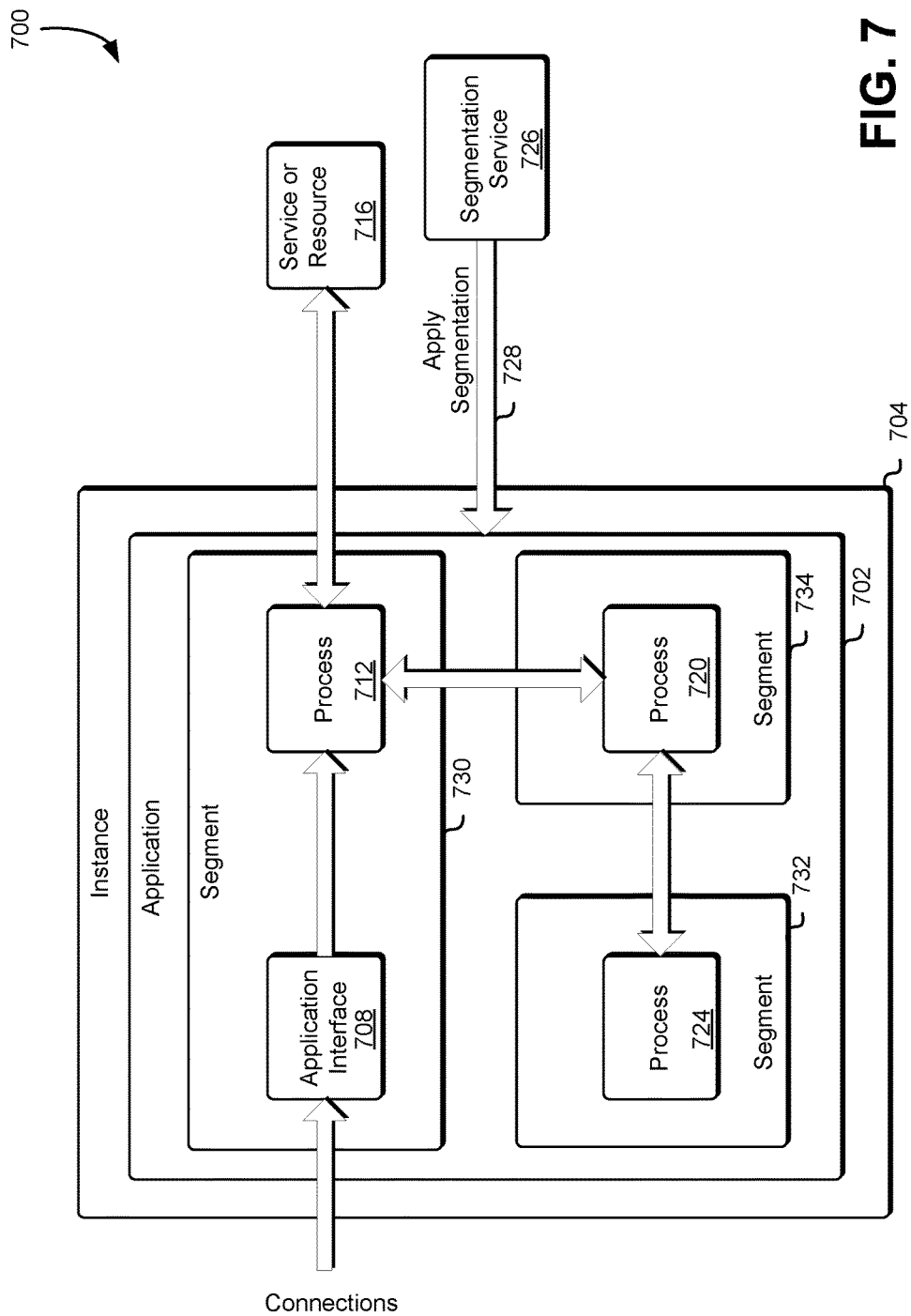
FIG. 7 illustrates an example environment where an application is segmented.

FIG. 7 illustrates an example environment 700 where an application is segmented as described in connection with FIG. 5 and in accordance with an embodiment. In the example illustrated in FIG. 7, an application running on an instance includes an application interface 708 (corresponding to the first process 512 described in connection with FIG. 5), a first process 712 (corresponding to the first process 512 described in connection with FIG. 5), a second process 720 (corresponding to the second process 520 described in connection with FIG. 5), and a third process 724 (corresponding to the third process 524 described in connection with FIG. 5). The first process 712 also includes a connection to a service or resource 716 (corresponding to the service or resource 516 described in connection with FIG. 5) that is outside of the instance.

In the example illustrated in FIG. 7, the segmentation service 726 applies 728 the segmentation to the application based at least in part on the data and/or metadata in the application log as described above at least in connection with FIG. 5. The segmentation is generated by clustering processes into segments of the application 702 on the instance 704. The segmentation of the application illustrated in FIG. 7 may be performed by, for example, subdividing the application space, managing interprocess communications, or instantiating a virtual network within the application. In the example illustrated in FIG. 7, the application interface 708 and the first process 712 are clustered in segment 730, the second process 720 is clustered in segment 734, and the third process 724 is clustered in segment 732. In the example illustrated in FIG. 7, the instance 704 is the same as the instance 504 described in connection with FIG. 5.

Figure 8:
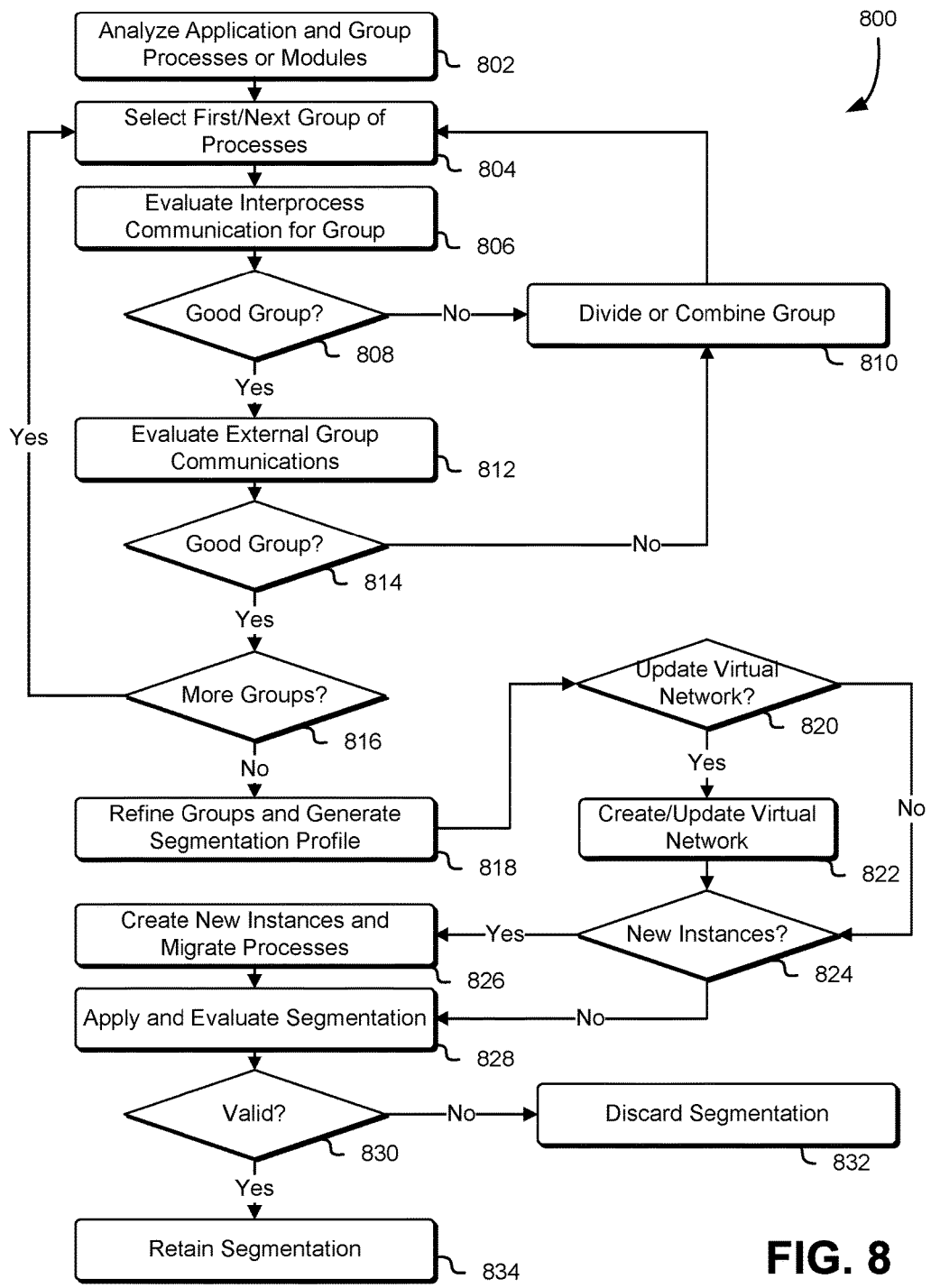
FIG. 8 illustrates an example process for analyzing and segmenting an application.

FIG. 8 illustrates an example process 800 for analyzing and segmenting an application as described in connection with FIGS. 1 and 5 and in accordance with an embodiment.

A segmentation service such as the segmentation service 526 described in connection with FIG. 5 may perform the example process 800 illustrated in FIG. 8. The segmentation service may first analyze 802 the application and generate a preliminary grouping of the processes and/or modules of the application from, for example, an application log as described above. For example, a pattern of regular interprocess communications between a pair of processes or modules in an application may cause the segmentation service to place the pair of processes or modules into the same group or cluster.

The segmentation service may then begin selecting 804 groups of processes or modules for analysis. First, the segmentation service may analyze the processes or modules and the application data and/or metadata from the application log to determine 806 interprocess communications between processes or modules within the group of processes or modules. Using the aforementioned example, the pattern of regular network connections between the pair of processes or modules may indicate a dependency between those two processes or modules because, for example, the two processes or modules consistently share data or functionality between them. Based on the determined interprocess communications, the segmentation service may then determine 808 whether or not the group is a good group. The segmentation service may determine 808 that the group is a good group if the processes or modules in the group have, for example, consistent and regular communications between them and few communications to other processes or modules not in the group.

If the segmentation service does not determine 808 that the group is a good group, the segmentation service may then either divide 810 the group or combine one or more processes or modules in the group with processes or modules in other groups to improve the grouping. Again, such decisions on whether to divide 810 the group or combine one or more processes or modules in the group with processes or modules in other groups may be based at least in part on the interprocess communications between the processes or modules in the group and/or on the application data and/or metadata. The decision on whether to divide 810 the group or combine one or more processes or modules in the group with processes or modules in other groups may also be based on other data and/or metadata associated with the application. For example, as described above, an application, process, or module may have a generated profile that indicates the privileges, resources, and networks associated with the application. The application, process, or module may also have a process communication profile that specifies which other applications, processes, or modules the application, process, or module may communicate with. For example, an application, process, or module may have a process communication profile that restricts communication with any entity outside of a particular network. Using these profiles, a segmentation service can propose a segmentation that segments the application, process, or module into two or more applications, processes, or modules.

If the segmentation service does determine 808 that the group is a good group, the segmentation service may then analyze the processes or modules and the application data and/or metadata to evaluate 812 external dependencies between one or more processes or modules within the group of processes or modules and other processes or modules, services, or resources outside the group of processes or modules. Using the aforementioned example, a pattern of regular communications between a process or module in the group and a process, module, application, service, or resource outside of the group may indicate an external dependency of the group. Based on the determined external dependencies, the segmentation service may again determine 814 whether or not the group is a good group. If the segmentation service does not determine 814 that the group is a good group, the segmentation service may again either divide 810 the group or combine one or more processes or modules in the group with processes or modules in other groups to improve the grouping.

When there are no more groups 816 to analyze, the segmentation service may then refine the existing groups and generate 818 a segmentation profile of the application based at least in part on the finalized groups. The segmentation service may then determine 820 whether to update the virtual network. The segmentation service may update the virtual network by, for example, adding new segments, updating the network routing table if the virtual network exists prior to the segmentation, and/or generating a new routing table. The segmentation service may also update the virtual network by, for example, creating a new virtual network, adding new segments, and/or updating the network routing table if the virtual network does not exist prior to the segmentation. If the segmentation does determine 820 to update the virtual network, the segmentation service may then create and/or update the virtual network 822.

The segmentation service may then determine 824 whether the segmentation requires new instances if, for example, the segmentation is based on segmenting a virtual network associated with the application. If the segmentation service does determine 824 that new instances are required, the segmentation service may cause a service to create 826 the new instances and migrate one or more processes or modules to the new instances. The segmentation service may then apply and evaluate the segmentation 828. If the segmentation service determines 830 that the segmentation is valid, the segmentation service may retain 834 the segmentation. Conversely, if the segmentation service determines 830 that the segmentation is not valid, then the segmentation service may discard 832 some or all of the segmentation. As described above, the segmentation may also be evaluated without applying it first by, for example, analyzing a segmentation profile or a list of changes to an existing segmentation. The segmentation may also be applied in a test network as described herein and that test network used to evaluate the segmentation before applying it to a production network.

Figure 9:
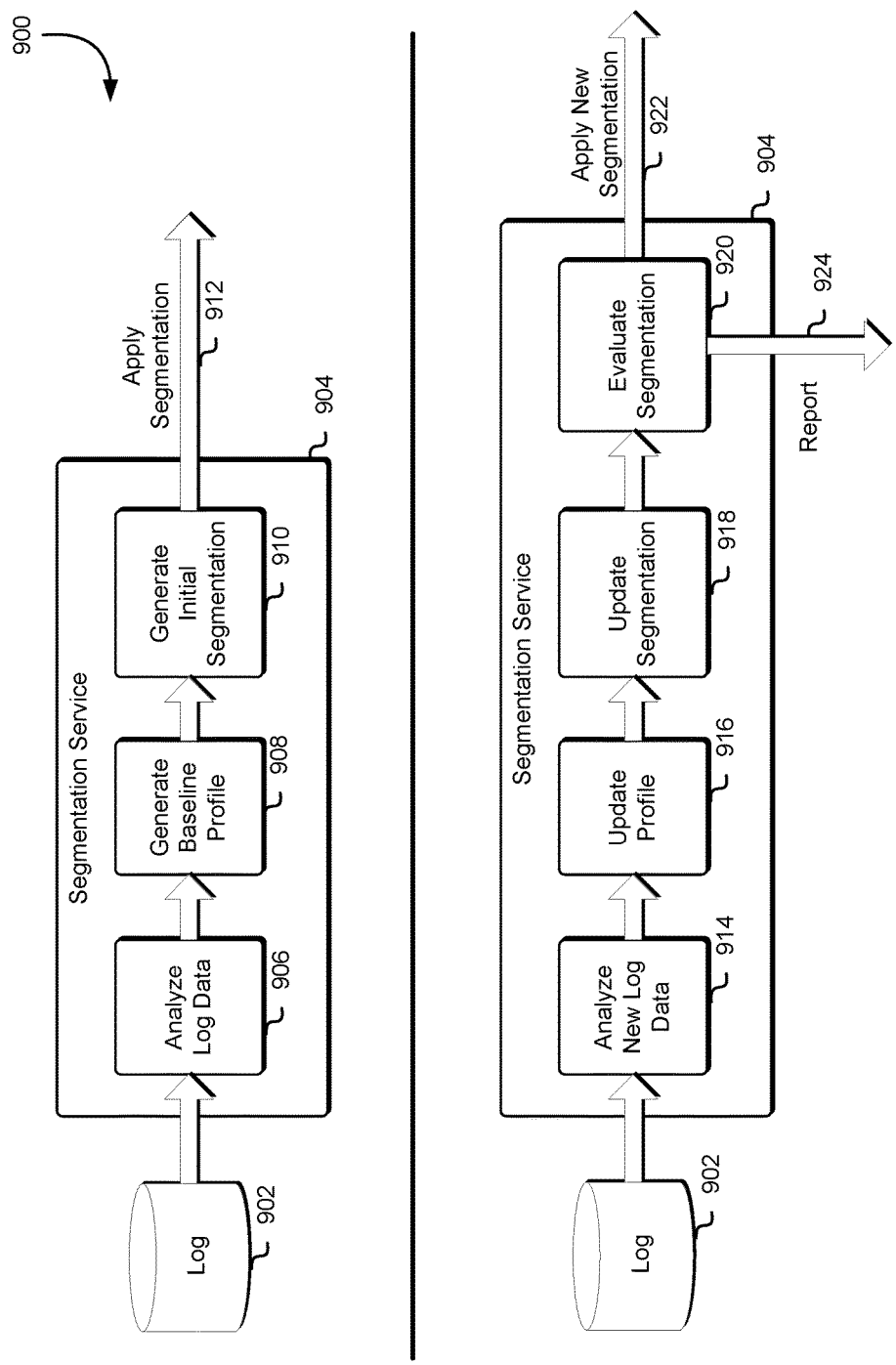
FIG. 9 illustrates an example environment where a segmentation service analyzes log data to determine segmentation.

FIG. 9 illustrates an example environment 900 where a segmentation service analyzes log data to determine segmentation as described at least in connection with FIGS. 1 and 5 and in accordance with an embodiment. In the example illustrated in FIG. 9, data, and/or metadata in a log 902 is provided to a segmentation service 904. The data and/or metadata in the log 902 may include network flow data, application data, or a combination of these and/or other data items associated with segmenting a virtual network or application. The segmentation service 904 may then analyze 906 the log data, generate a baseline profile 908, and generate an initial segmentation 910 based at least in part on the baseline profile. In an embodiment, the baseline profile and the initial segmentation are the same (i.e., the baseline profile may be expressed as a segmentation of the virtual network or the application). The segmentation may then apply 912 the initial segmentation to a production environment and/or to a testbed environment 912 as described above.

As additional data and/or metadata is provided to the log 902, the segmentation service may update the segmentation of the virtual network or application by first analyzing the new log data 914, updating the profile 916 of the segmentation, and/or updating the segmentation 918. For example, the initial segmentation of a virtual network may cluster two instances in different segments but new data and/or metadata (e.g., network flow data) may be received in the log 902 that indicates a frequent communications dependency between the two separate instances. Such data and/or metadata may cause the segmentation service 904 to update the profile and/or update the segmentation to cluster the two instances in the same group.

Before applying 922 the new segmentation, the segmentation service may evaluate 920 the segmentation as described above. The segmentation service may also generate a report 924 about the new segmentation by, for example, generating a message, alert, or email to an administrator of the virtual network or application indicating changes to the segmentation as a result of the new log data and/or metadata. Using the example above, the report 924 may send a notification to the administrator of the virtual network or application that two instances in two separate segments of a virtual network (e.g., two different subnets) were joined into the same segment as a result of new log data and/or metadata. In an embodiment, the report 924 includes a listing of changes (also referred to herein as a "difference") of the profile and/or segmentation. In an embodiment, the administrator can provide feedback about the proposed changes choosing, in the feedback, to alter or override one or more aspects of the segmentation. For example, the administrator may provide feedback that accepts some segments, rejects other segments, or proposes additional segments based on the difference provided.

Figure 10:
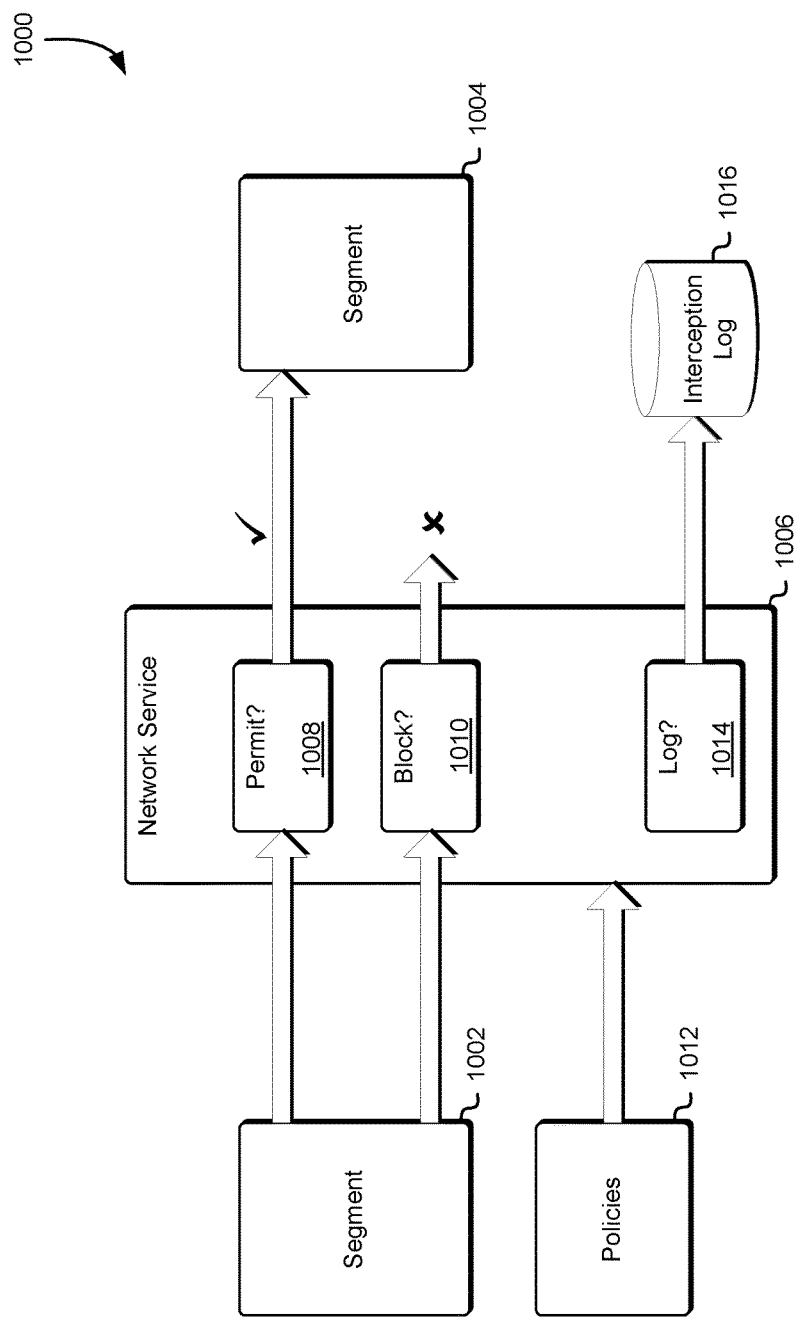
FIG. 10 illustrates an example environment where communications between segments are processed and analyzed.

FIG. 10 illustrates an example environment 1000 where communications between segments are processed and analyzed as described at least in connection with FIGS. 1 and 5 and in accordance with an embodiment. In the example illustrated in FIG. 10, communications from a first segment 1002 are sent to a second segment 1004 that is disjoint from the first segment 1002 (i.e., the first segment 1002 and the second segment 1004 do not overlap and are not clustered together). A network service 1006 may intercept the communications from the first segment 1002 to the second segment 1004 and, based at least in part on one or more policies 1012, may determine whether to permit 1008 the communication or block 1010 the communication. In an embodiment, a segmented network blocks communications between different segments as described herein. In another embodiment, a segmented network permits communications between different segments as described herein. In yet another embodiment, a segmented network logs all communications between segments as described herein.

For example, the policies 1012 may be permissive (i.e., may be directed to allowing normally restricted communications) and may cause the network service 1006 to permit 1008 communications between the first segment 1002 and the second segment 1004, which may typically be blocked. Conversely, the policies 1012 may be restrictive (i.e., may be directed to blocking any restricted communications) and may cause the network service 1006 to block 1010 such communications between the first segment 1002 and the second segment 1004. Policies may be permissive or restricted for a number of reasons. For example, a new segmentation that is being evaluated to see if it should be implemented in production may have permissive policies to detect security vulnerabilities introduced as a result of the new segmentation. Conversely, the same new segmentation once placed in production may have restricted polices to prevent any undetected security vulnerabilities.

In the example illustrated in FIG. 10, the network service 1006 also determines whether to log 1014 the permitted and/or blocked communications between the first segment 1002 and the second segment 1004 in an interception log 1016. The interception log 1016 may include log entries related to permitted communications that might typically be blocked, blocked communications, and other such network communication events. A log entry in the interception log 1016 may also include metadata associated with the permitted and/or blocked communications including, but not limited to, the policy used to make the decision, the instance, application, process, or module of the segment that initiated the connection, or the instance, application, process, or module of the segment that was supposed to receive the connection. In an embodiment, the interception log 1016 is used by the segmentation service to generate and/or refine the segmentation of the virtual network or application.

Figure 11:
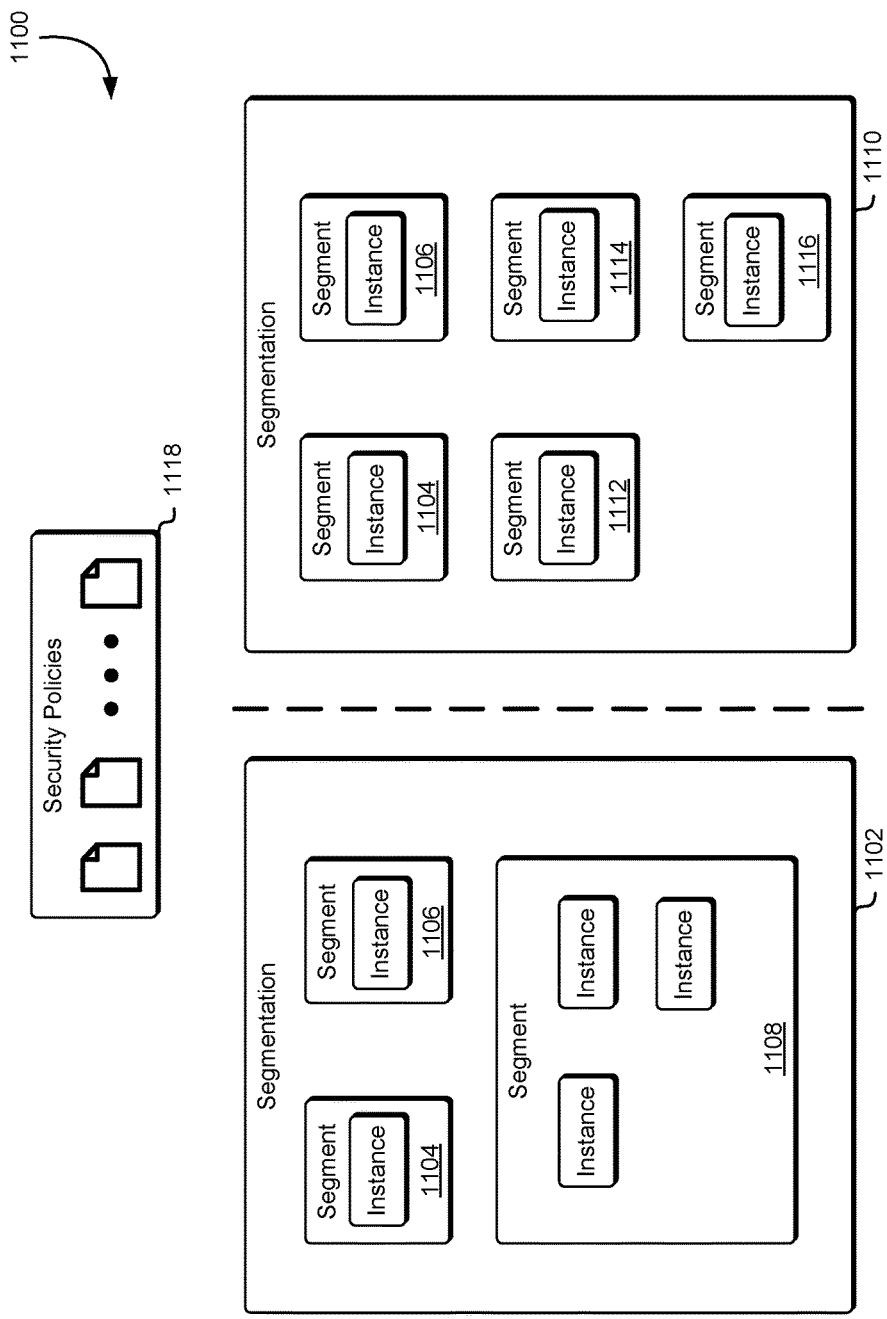
FIG. 11 illustrates an example environment where segmentations are chosen according to security policies.

FIG. 11 illustrates an example environment 1100 where segmentations are chosen according to security policies as described at least in connection with FIGS. 1 and 5 and in accordance with an embodiment. In the example illustrated in FIG. 11, a less restrictive segmentation 1102 has a first segment 1104 containing an instance, a second segment 1106 containing an instance, and a third segment 1108 containing three instances and a more restrictive segmentation 1110 has the first segment 1104 containing an instance and the second segment 1106 containing an instance, but the third segment 1108 has been segmented to three segments (segment 1112, segment 1114, and segment 1116) each containing a single instance.

The decision to use the more restrictive segmentation 1110 or the less restrictive segmentation 1102 may be based on one or more security policies 1118. For example, the one or more security policies 1118 may favor a higher level of security for the segmentation and thus, favor the more restrictive segmentation 1110. The more restrictive segmentation 1110 may, for example, require additional authorization for communications between the different segments. Conversely, the one or more security policies 1118 may favor a lower level of security for the segmentation and thus, favor the less restrictive segmentation 1102. The less restrictive segmentation 1102 may, for example, require less authorization for communications between the different segments.

In an embodiment, the security policies 1118 include one or more preferences specified by a customer associated with a virtual network. These preferences may alter or override the segmentation or the segmentation profile. For example, a security policy may specify that communications between two of the instances in the third segment 1108 should be segmented (i.e., in a more restrictive segmentation such as the more restrictive segmentation 1110) but the customer associated with the virtual network may not ever want those two instances to be segmented. In this example, the customer may specify preferences that include a preference that the two instances not be segmented, thus overriding the proposed segmentation. As may be contemplated, the examples of the preferences that a customer may specify to alter or override the segmentation or the segmentation profile are merely illustrative examples and other preferences may be considered as within the scope of this disclosure.

Figure 12:
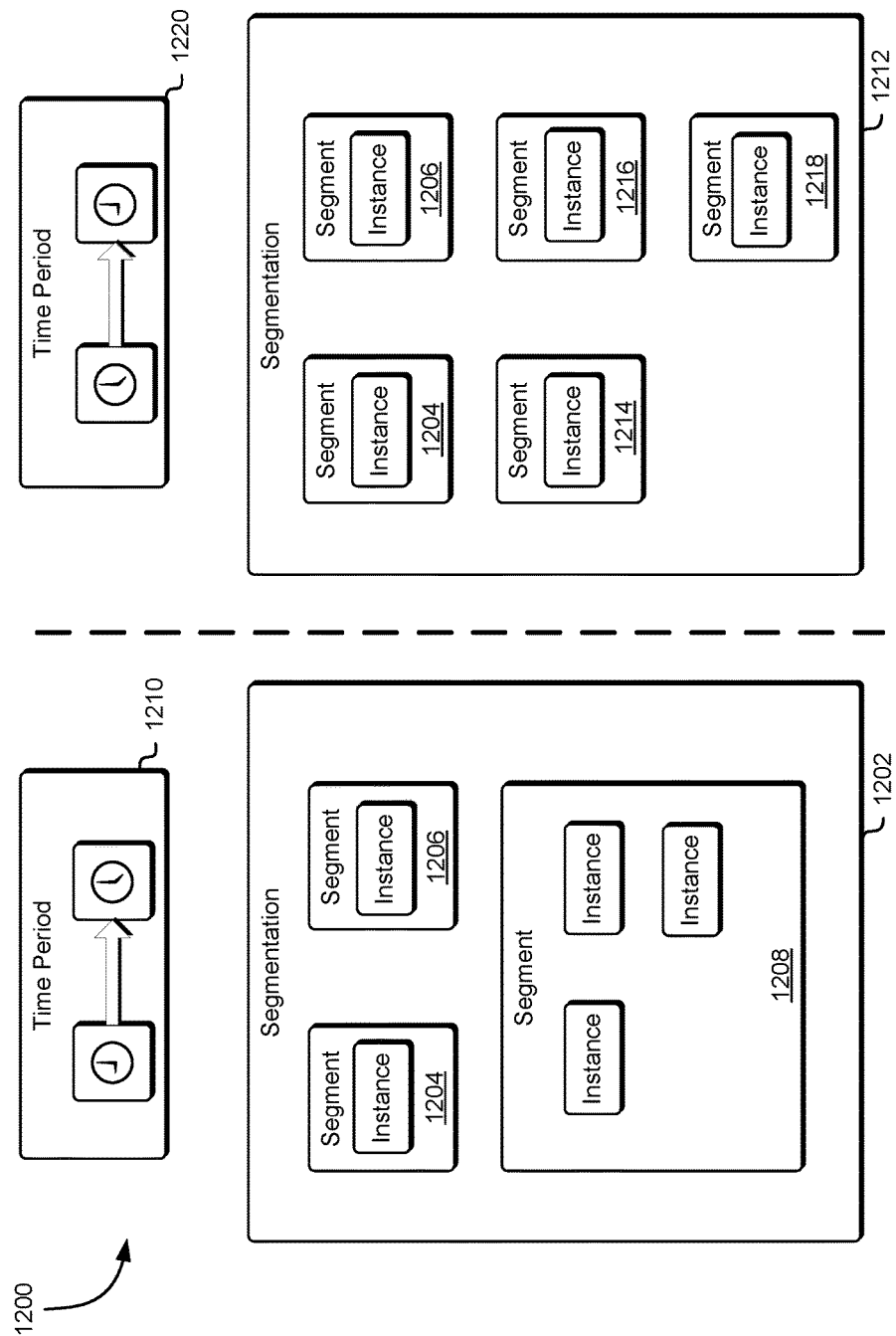
FIG. 12 illustrates an example environment where segmentations are chosen according to time periods.

FIG. 12 illustrates an example environment 1200 where segmentations are chosen according to time periods as described at least in connection with FIGS. 1 and 5 and in accordance with an embodiment. As with the example illustrated in FIG. 11, in the example illustrated in FIG. 12, a less restrictive segmentation 1202 has a first segment 1204 containing an instance, a second segment 1206 containing an instance, and a third segment 1208 containing three instances and a more restrictive segmentation 1212 has the first segment 1204 containing an instance and the second segment 1206 containing an instance, but the third segment 1208 has been segmented to three segments (segment 1214, segment 1216, and segment 1218) each containing a single instance.

In the example illustrated in FIG. 12, the less restrictive segmentation 1202 is in effect during a first time period 1210 (e.g., between, for example, the hours of 9:00 AM and 5:00 PM) and the more restrictive segmentation 1212 is in effect during a second time period 1220 (e.g., between, for example, the hours of 5:00 PM and 9:00 AM). The example illustrated in FIG. 12 shows an example of a time-based segmentation approach which may be used for a system that periodically must operate with different privileges and/or permissions. Such systems may, for example, put restrictions on access based on different user credentials or different levels of network accesses. During these time periods, a different (e.g., more or less restrictive) segmentation may be substituted for a baseline segmentation.

Figure 13:
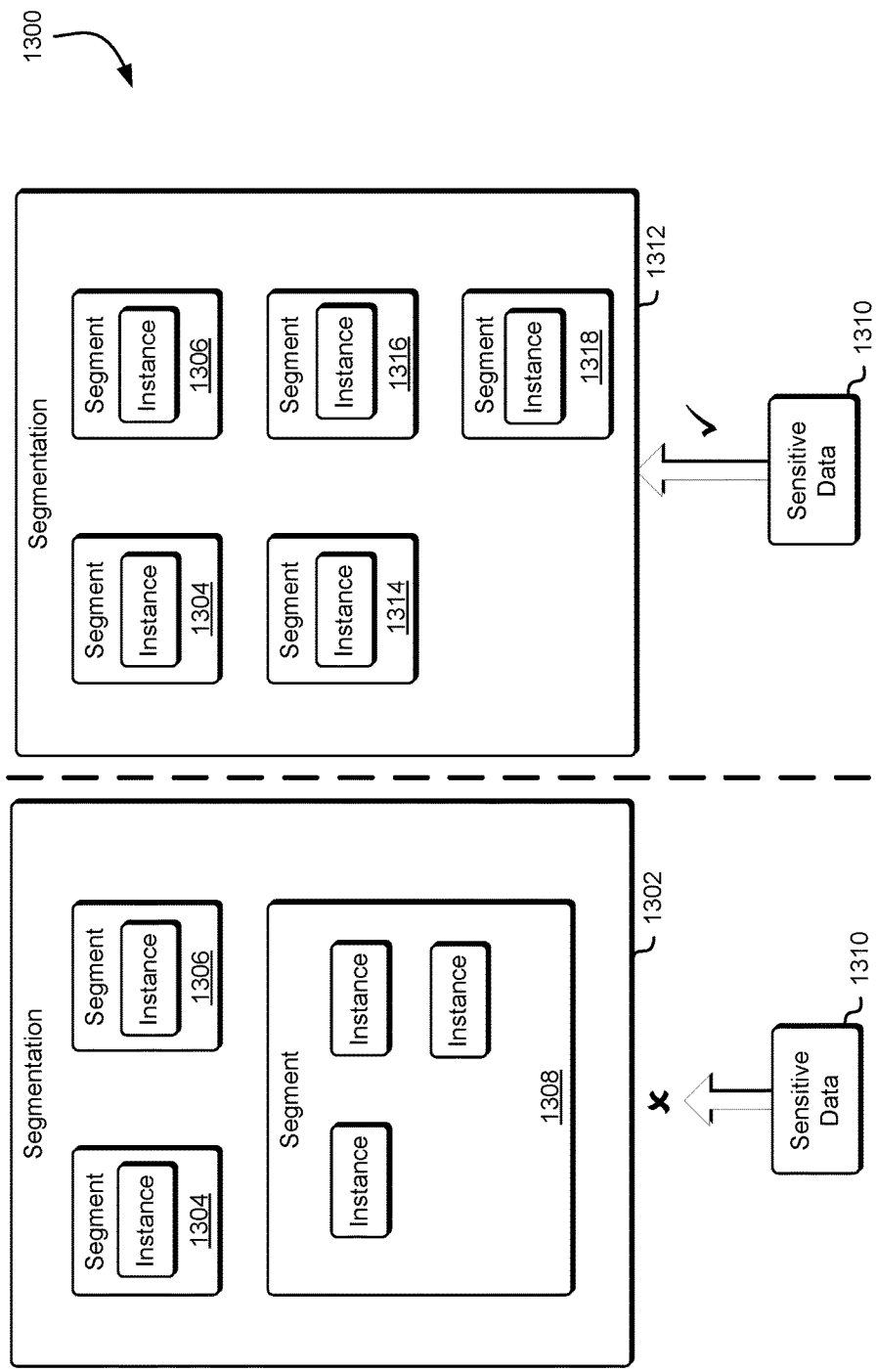
FIG. 13 illustrates an example environment where segmentations are chosen according to data sensitivity.

FIG. 13 illustrates an example environment 1300 where segmentations are chosen according to data sensitivity as described at least in connection with FIGS. 1 and 5 and in accordance with an embodiment. As with the examples illustrated in FIGS. 11 and 12, in the example illustrated in FIG. 13, a less restrictive segmentation 1302 has a first segment 1304 containing an instance, a second segment 1306 containing an instance, and a third segment 1308 containing three instances and a more restrictive segmentation 1312 has the first segment 1304 containing an instance and the second segment 1306 containing an instance, but the third segment 1308 has been segmented to three segments (segment 1314, segment 1316, and segment 1318) each containing a single instance.

In the example illustrated in FIG. 13, the less restrictive segmentation 1302 may be in place when sensitive data 1310 such as, for example, customer identified data, is not available to the system. Conversely, when the sensitive data 1310 is available to the system, the more restrictive segmentation may be used. When sensitive data is available to the system, the sensitive data is accessible by the system (e.g., is accessible by one or more virtual machine instances in the system). It should be noted that the segmentation based on security policies illustrated in FIG. 11, the segmentation based on time illustrated in FIG. 12, and/or the segmentation based on data illustrated in FIG. 13 may be combined to operate together. For example, a regular upload of customer data at a set time may cause a segmentation based on both time and data.

Figure 14:
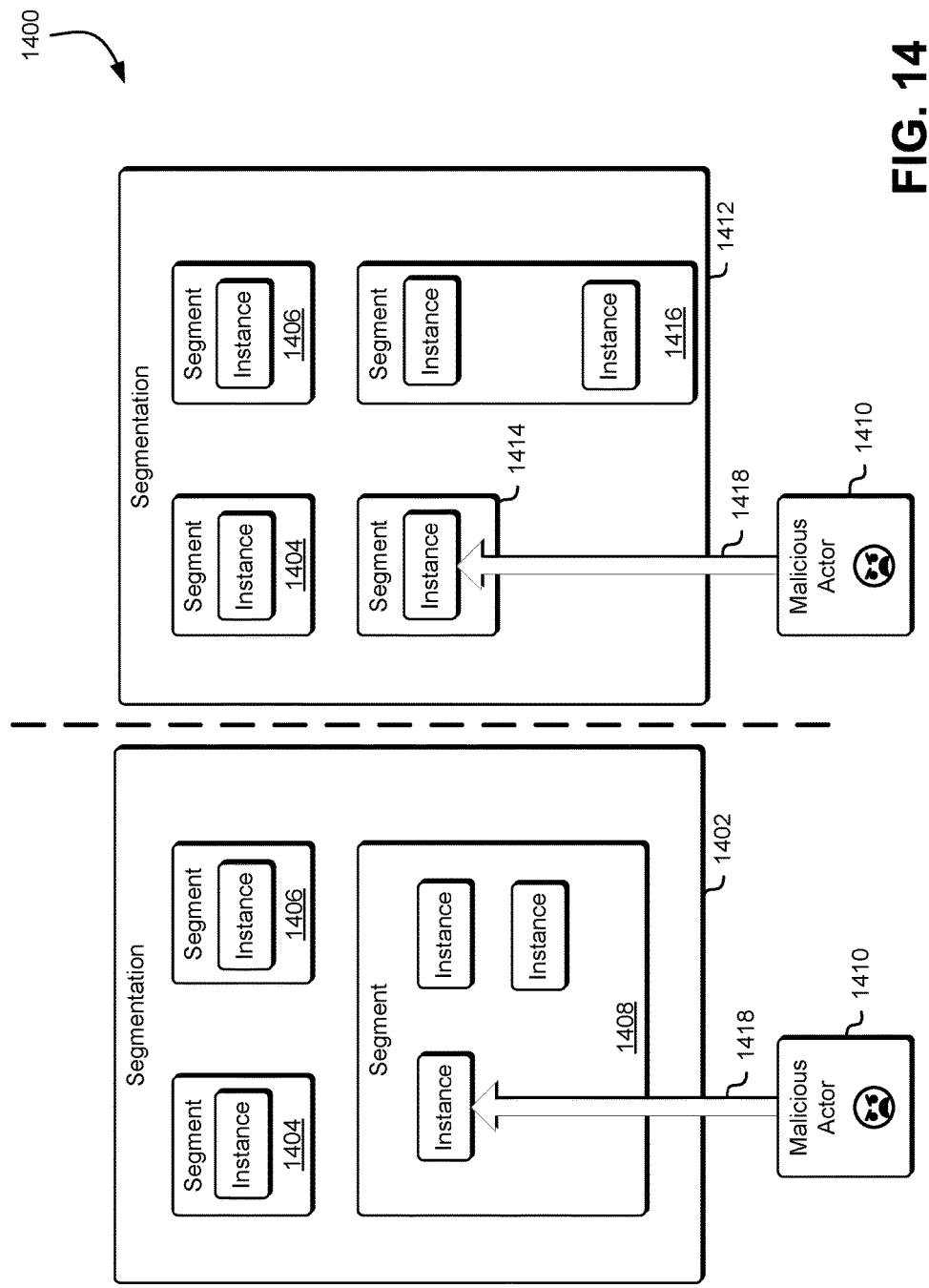
FIG. 14 illustrates an example environment where segmentations are chosen according to intrusion risks.

FIG. 14 illustrates an example environment 1400 where segmentations are chosen according to intrusion risks as described at least in connection with FIGS. 1 and 5 and in accordance with an embodiment. As with the examples illustrated in FIGS. 11, 12, and 13, in the example illustrated in FIG. 14, a less restrictive segmentation 1402 has a first segment 1404 containing an instance, a second segment 1406 containing an instance, and a third segment 1408 containing three instances and a more restrictive segmentation 1412 has the first segment 1404 containing an instance and the second segment 1406 containing an instance, but the third segment 1408 has been segmented to two segments with segment 1414 containing a single instance and segment 1416 containing two instances.

In the example illustrated in FIG. 14, the less restrictive segmentation 1402 may be in place during normal operations, prior to an attempt by a malicious actor 1410 to connect 1418 with an instance in the third segment 1408. A risk assessment of the connection attempt by the malicious actor 1410 may be made based on, for example, one or more intrusion detection techniques. For example, the connection attempt by the malicious actor 1410 may be detected using intrusion detection techniques such as whether the connection comes from a known bad IP address, whether the connection comes from a known bad proxy network, whether the connection comes from a known bad location, or based on some other threat intelligence. The risk assessment of the connection attempt by the malicious actor 1410 may also be detected based on a volume of communications over the connection 1418 and/or the type of communications over the connection 1418. In the example illustrated in FIG. 14, the segmentation is based on the threat analysis of the system and the particular instance that may be at risk.

When the connection attempt by the malicious actor 1410 is detected, the more restrictive segmentation 1412 may be used where the instance in the segment 1414 is isolated from the other segments but the connection 1418 may be allowed. The connection 1418 by the malicious actor 1410 may be allowed to, for example, determine whether the malicious actor is not acting maliciously (e.g., when a connection from a valid actor is coming from a questionable location) or to perform threat analysis and/or perform intrusion countermeasures. Because the instance in the segment 1414 is isolated, the potential threat of allowing the connection 1418 is reduced. It should be noted that the segmentation based on security policies illustrated in FIG. 11, the segmentation based on time illustrated in FIG. 12, the segmentation based on data illustrated in FIG. 13, and/or the segmentation based upon intrusion risks illustrated in FIG. 14 may be combined to operate together. For example, an actor may be reclassified as a potentially malicious actor at a set time and/or when sensitive data is present in the system, causing a less restrictive segmentation to be replaced by a more restrictive segmentation.

Figure 15:
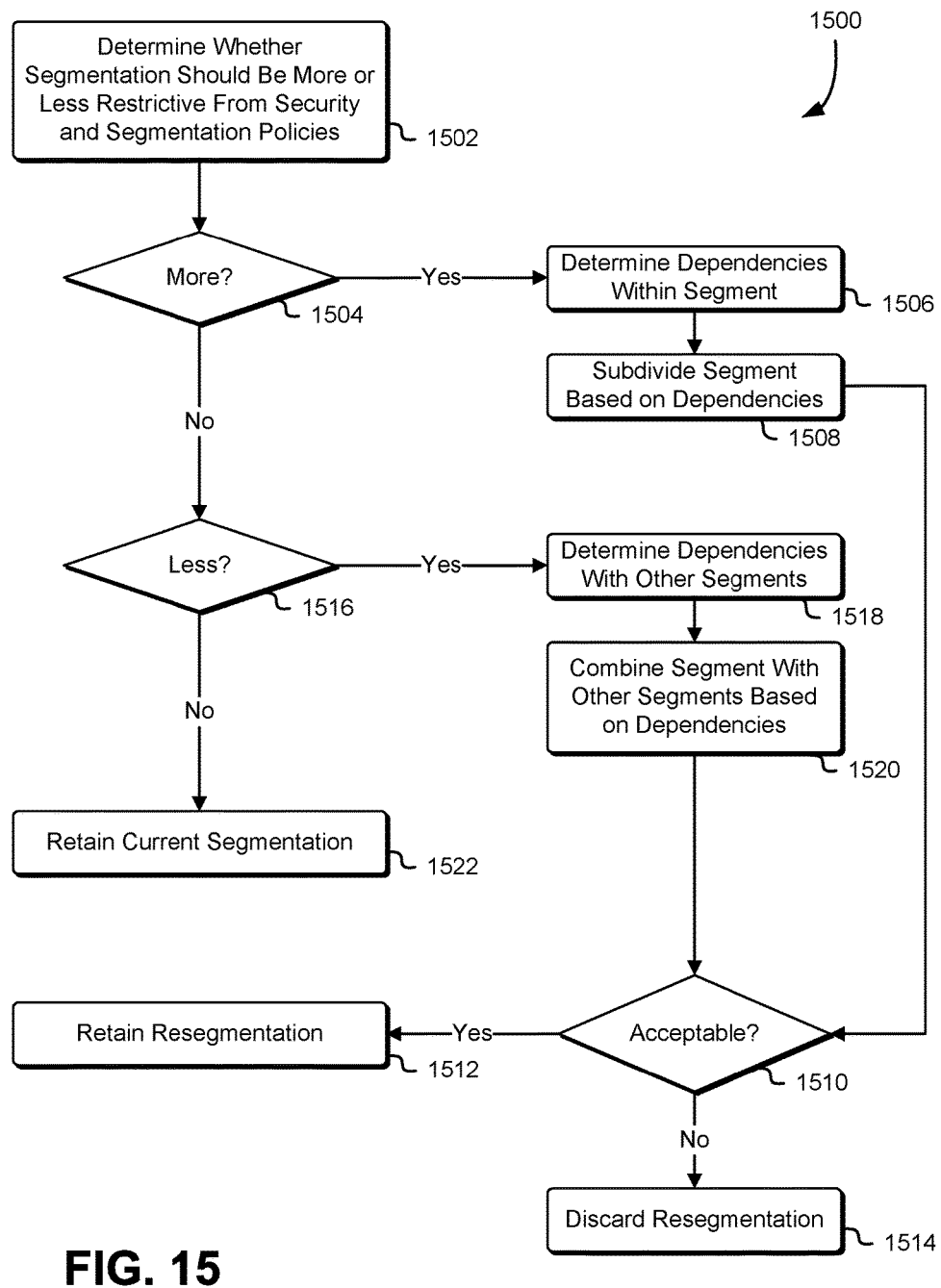
FIG. 15 illustrates an example process for analyzing and selecting segmentations.

FIG. 15 illustrates an example process 1500 for analyzing and selecting segmentations as described at least in connection with FIGS. 1 and 5 and in accordance with an embodiment. A segmentation service such as the segmentation service 118 described in connection with FIG. 1 or a segmentation service such as the segmentation service 526 described in connection with FIG. 5 may perform the example process 1500 illustrated in FIG. 15. The segmentation service may first determine 1502 whether an existing segmentation should be more or less restrictive based at least in part on one or more segmentation or security policies. The segmentation or security policies may include policies based on a desired level of security for a system, time-based policies that adjust the segmentation based at least in part on a time of day, or data-based polices that adjust the segmentation based at least in part on the presence of one or more sensitive data items that may be accessible by applications or instances within the system.

If the segmentation service determines 1504 that the segmentation should be more restrictive, then the segmentation may determine 1506 one or more dependencies within the segment and may subdivide 1508 the segment according to those dependencies. For example, a segment may include a plurality of instances, applications, processes, or modules and, based on the dependencies between those instances, applications, processes, or modules, the segmentation may add additional segments and migrate one or more of the instances, applications, processes, or modules to the additional segments.

The segmentation service may then determine 1516 whether the segmentation should be less restrictive. If the segmentation does not determine 1516 that the segmentation should be less restrictive, the segmentation service may retain 1522 the current segmentation. Conversely, if the segmentation service does determine 1516 that the segmentation should be less restrictive, then the segmentation may determine 1518 one or more dependencies between the segment and other segments and may combine 1520 one or more segments together according to those dependencies. For example, one or more instances, applications, processes, or modules of the segment may be combined with instances, applications, processes, or modules in other segments by migrating the one or more of the instances, applications, processes, or modules to other segments.

After subdividing (or combining) segments to produce a new segmentation, the segmentation service may then test and/or evaluate the new segmentation to determine 1510 whether the new segmentation is an acceptable segmentation (e.g., if the system functions correctly under the new segmentation). If the segmentation service does determine 1510 that the new segmentation is an acceptable segmentation, the segmentation service may retain 1512 the segmentation. Conversely, if the segmentation service does not determine 1510 that the new segmentation is an acceptable segmentation, the segmentation service may discard 1514 the segmentation.

Figure 16:
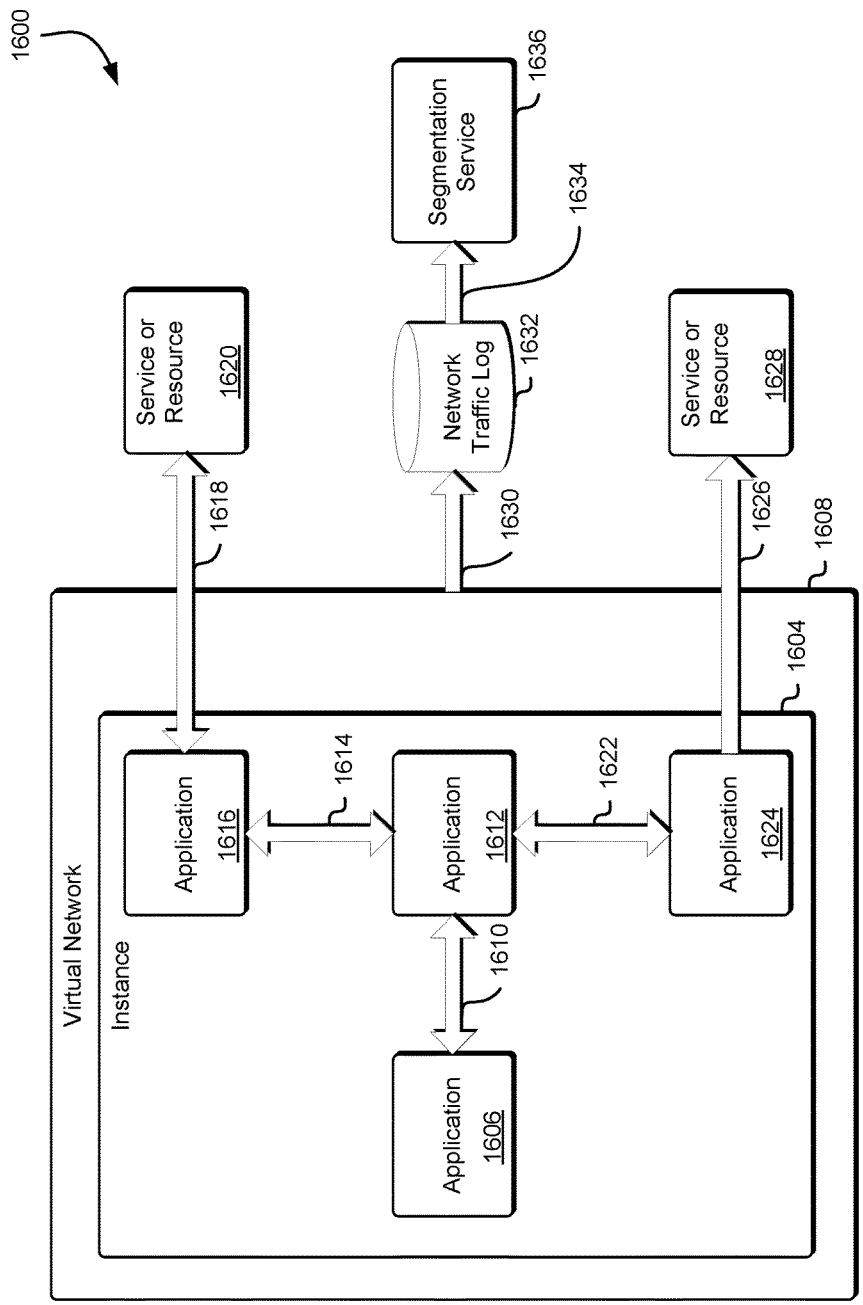
FIG. 16 illustrates an example environment where a set of applications is analyzed for segmentation.

FIG. 16 illustrates an example environment 1600 where a set of applications is analyzed for segmentation in accordance with an embodiment. In the example illustrated in FIG. 16, a plurality of applications is running on a virtual machine instance 1604 within a virtual network 1608 as described above. Connections between the applications are denoted by the arrows. In the example illustrated in FIG. 16, a virtual machine instance 1604 is shown, but in an example, the plurality of applications may be operating on a plurality of virtual machine instances within the virtual network. Although not illustrated in FIG. 16, there may also be connections between one or more users and, for example, the application 1606 such as those described above. For each connection between the users and the applications, one or more network traffic data entries is created that specifies a connection between a network address associated with each of the users and the network address of the application. The network traffic data entries may also specify, for example, the internet service provider ("ISP") of the user, the country of origin of the user, whether the user is using a proxy network or an anonymizer service, or other such network data and/or metadata.

One or more network traffic data entries may be created based at least in part on connections 1610 between the application 1606 and the application 1612, connections 1614 between the application 1612 and an application 1616, or connections 1622 between the application 1612 and an application 1624. Each of these network traffic data entries may include a source network address of one of the applications within the virtual network 1608 and may also include a destination network address of another one of the applications within the virtual network 1608.

Similarly, one or more network traffic data entries is created based at least in part on connections 1618 between the application 1616 and a service or resource 1620 that is outside of the virtual network 1608 and/or connections 1626 between the application 1624 and a service or resource 1628 that is outside of the virtual network 1608. Each of these network traffic data entries may include a source network address of, for example, one of the applications within the virtual network 1608 and may also include a destination network address that is not within the virtual network 1608. In an embodiment, the destination network address may be a network address within the computing resource service provider environment, or may be a network address outside of the computing resource service provider environment. In another embodiment, the source and/or the destination network address may be the network address of the virtual machine instance 1604.

Each of the one or more network traffic data entries may be stored 1630 in a network traffic log 1632, the contents of which is provided 1634 to a segmentation service 1636 for analysis and processing of the data and/or metadata associated with the network traffic data entries. For example, the connections to the application 1606 may be analyzed to determine a range and/or type of network addresses of the users. In another example, the connections 1614 between the application 1612 and the application 1616 may be analyzed to determine network traffic patterns between these two applications. The network traffic patterns may be determined based on one or more shared characteristics of the connection including, but not limited to, times of peak traffic, times of low traffic, the type of connection, the bandwidth used, the type of data sent across the connection, or other network traffic data and/or metadata. Similarly, the connections 1626 between the application 1624 and the service or resource 1628 may be analyzed to determine, for example, the type and nature of the connection or the network location of the service or resource 1628.

Figure 17:
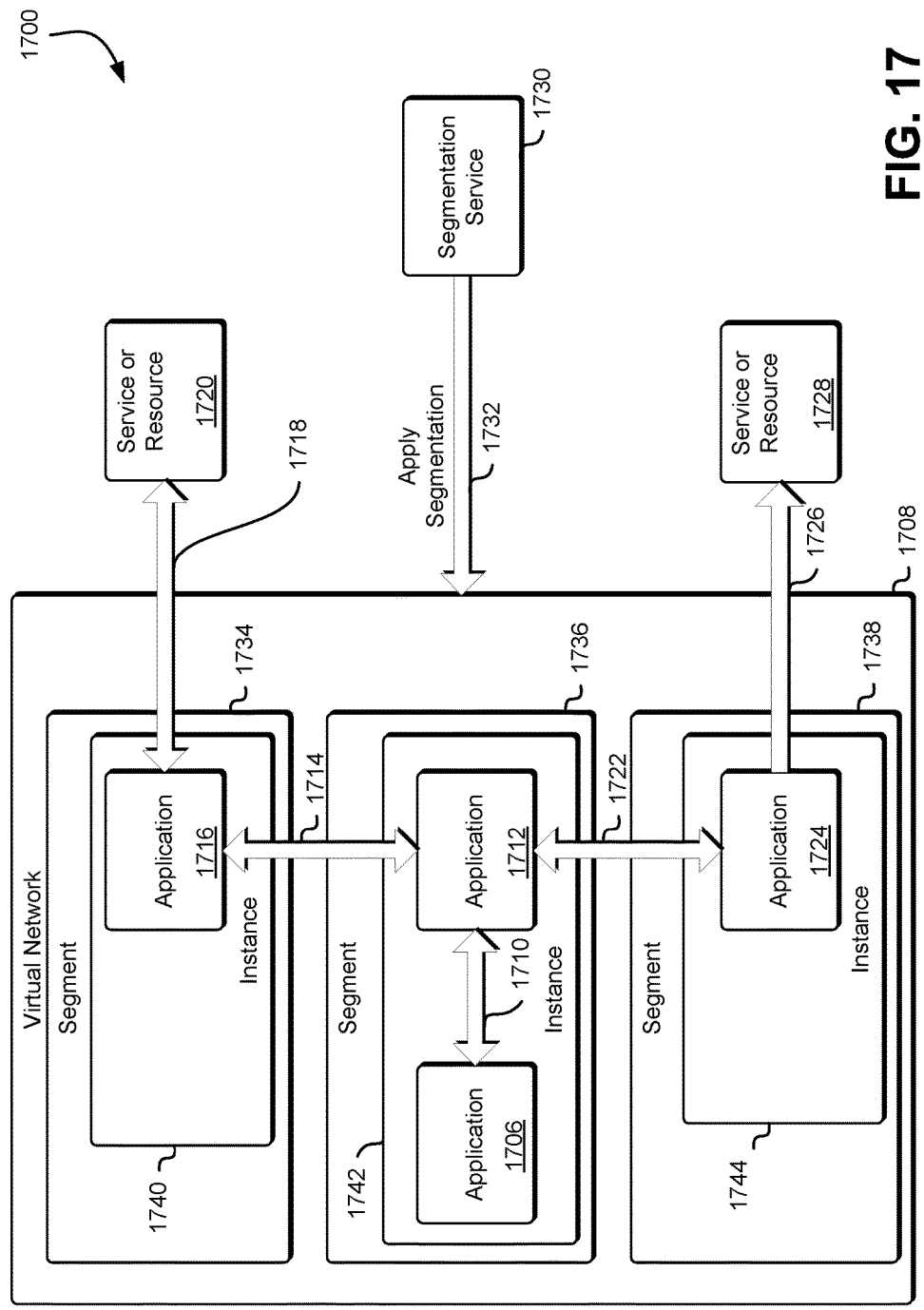
FIG. 17 illustrates an example environment where new instances are added to segment a set of applications.

FIG. 17 illustrates an example environment 1700 where new instances are added to segment sets of applications as described in connection with FIG. 16 and in accordance with an embodiment. The example illustrated in FIG. 17 is a segmentation of the virtual network 1608 described in connection with FIG. 16. In the example illustrated in FIG. 17, communications 1710 between an application 1706 and an application 1712, connections 1714 between the application 1712 and an application 1716, and connections 1722 between the application 1712 and an application 1724 may exist within the virtual network 1708 such as the connection described above. Additionally, connections 1718 between the application 1716 and a service or resource 1720 that is outside of the virtual network 1708 and/or connections 1726 between the application 1724 and another service or resource 1728 that is outside of the virtual network 1708 may also exist as described above.

A segmentation service 1730 may use network traffic data entries such as the network traffic data entries stored in the network traffic log 1632 described above in connection with FIG. 16 to create a segmentation of the virtual network and apply 1732 the segmentation. In the example illustrated in FIG. 17, the application 1706 and the application 1712 are clustered in the first segment 1736 and hosted on an instance 1742 within the first segment 1736, the application 1716 is clustered in the second segment 1734 and hosted on an instance 1740 within the second segment 1734, and the application 1724 is clustered in the third segment 1738 and hosted on an instance 1744 within the third segment 1738. The segmentation is applied by, for example, changing network addresses of the instances and/or interfaces in the virtual network 1708 as described above in connection with FIG. 3.

As described herein, each of the segments may be further updated based on additional network traffic data entries such as, for example, the network traffic data entries stored in the network traffic log 1632 described above in connection with FIG. 16. For example, the second segment 1734 and the third segment 1738 may be joined together (also referred to herein as "clustered together") based on a commonality of the connection between the applications inside the virtual network 1708 and the services or resources outside of the virtual network 1708. Similarly, the first segment 1736 may be further segmented to isolate the application 1706 and the application 1712, so that, for example, the application 1706 is assigned to one subnet of the virtual network 1708 and the application 1712 is assigned to a different subnet of the virtual network 1708.

In the examples illustrated in FIGS. 1-3, the segmentation of a virtual network is shown. In the examples illustrated in FIGS. 5-7, the segmentation of an application is shown. In the examples illustrated in FIGS. 16 and 17, the segmentation of a set of applications is shown. As may be contemplated, the techniques described herein may also be used at other abstraction layers within a computer system. For example, portions of an application or process may be segmented by instrumenting application processing interfaces or libraries associated with the application to determine communications interdependencies of the application or process and/or external dependencies of the application or process and using those interdependencies and external dependencies to segment the application or process. Similarly other aspects of an application or process are analyzed by a segmentation service to inform the segmentation of the application or process including, but not limited to, privileges granted to the application or process, resources associated with the application or process, or networks connected to the instance that hosts the application or instance. Such additional applications of an application or process may be independent of the execution of the application or process (i.e., may not be runtime determinations), but may be configuration parameters.

For example, an application, process, or module may have an application profile that specifies the privileges, resources, and networks associated with the application. Using this application profile, a segmentation service can propose a segmentation that segments the application, process, or module into two or more applications, processes, or modules and distribute those segmented applications, processes, or modules to multiple instances based on those privileges, resources, and networks. Each of these instances may operate in separate subnets (and thus in different segments). The configured instances and the segmentation may then be used as a provisioning template to instantiate further instances of the application, process, or module.

In an embodiment, the instances such as, for example, instance 1740 that hosts the application 1716 may be container instances. Similarly, the applications such as, for example, the application 1716 may be containers. As used herein, a container instance is an instance that allocates resources of a host computer system for the containers within the container instance. A container instance provides a virtualization layer for the containers in the container instance. A container instance may be a computer system instance (virtual or non-virtual) configured to support container instances (i.e., configured to support containerization). The container instance may have an allocated amount of processing resources and/or an amount of memory. Each container may be launched within the container instance from a software image and allocated an amount of resources from the pool of resources of the container instance. The container instance may also include a container agent which may be a separate running container configured to interface between the containers in the container instance and entities external to the container instance such as, for example, the service or resource 1720. The amount of resources to be allocated to each of the containers may be specified within a function definition. The agent may be used by the segmentation service 1730 to apply 1732 the segmentation.

Figure 18:
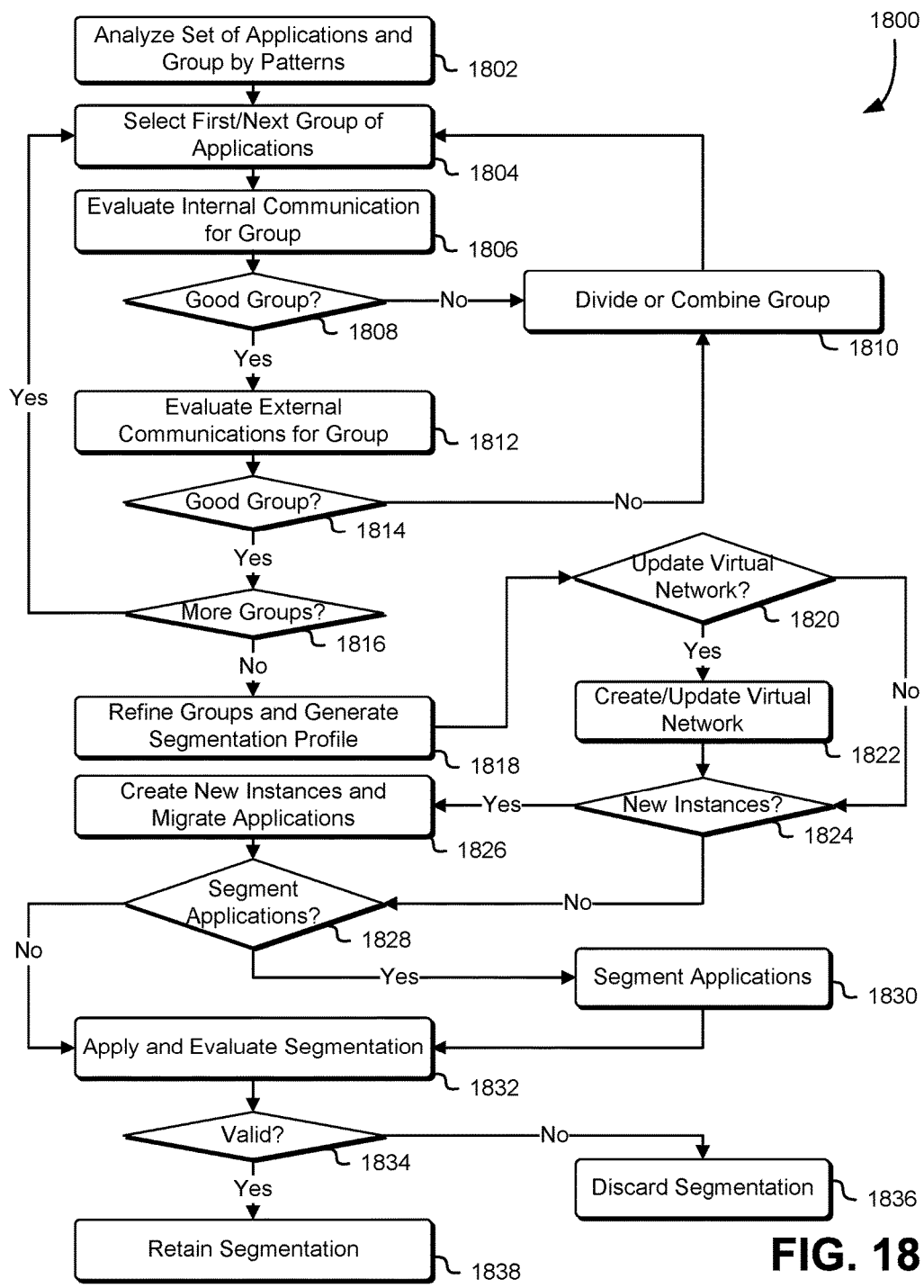
FIG. 18 illustrates an example process for analyzing and segmenting a set of applications.

FIG. 18 illustrates an example process 1800 for analyzing and segmenting sets of applications as described at least in connection with FIG. 16 and in accordance with an embodiment. A segmentation service such as the segmentation service 1636 described in connection with FIG. 16 may perform the example process 1800 illustrated in FIG. 18. The segmentation service may first analyze 1802 the set of applications and generate a preliminary grouping of the applications from, for example, a network or log as described above. For example, a pattern of regular communications between a pair of applications may cause the segmentation service to place the pair of applications into the same group or cluster.

The segmentation service may then begin selecting 1804 groups of applications for analysis. First, the segmentation service may analyze the applications, the communications data, the application data, the application profile, or other data and/or metadata from the network log or the application log to determine 1806 internal communications between applications within the group of applications. Using the aforementioned example, the pattern of regular network connections between the pair of applications may indicate a dependency between those two applications because, for example, the two applications consistently share data or functionality between them. Based on the determined internal communications, the segmentation service may then determine 1808 whether or not the group is a good group. The segmentation service may determine 1808 that the group is a good group if the applications in the group have, for example, consistent and regular communications between them and few communications to other applications not in the group.

If the segmentation service does not determine 1808 that the group is a good group, the segmentation service may then either divide 1810 the group or combine one or more applications in the group with applications in other groups to improve the grouping. Again, such decisions on whether to divide 1810 the group or combine one or more applications in the group with applications in other groups may be based at least in part on the internal communications between the applications in the group and/or on application data or metadata. The decision on whether to divide 1810 the group or combine one or more applications in the group with applications in other groups may also be based on other data and/or metadata associated with the application such as, for example, an application profile of the application as described above.

If the segmentation service does determine 1808 that the group is a good group, the segmentation service may then analyze the applications to evaluate 1812 external dependencies between one or more applications within the group of applications and other applications, processes, modules, services, or resources outside the group of applications. Using the aforementioned example, a pattern of regular communications between an application in the group and an application, process, module, application, service, or resource outside of the group may indicate an external dependency of the group. Based on the determined external dependencies, the segmentation service may again determine 1814 whether or not the group is a good group. If the segmentation service does not determine 1814 that the group is a good group, the segmentation service may again either divide 1810 the group or combine one or more applications in the group with applications in other groups to improve the grouping.

When there are no more groups 1816 to analyze, the segmentation service may then refine the existing groups and generate 1818 a segmentation profile for the set of applications based at least in part on the finalized groups. The segmentation service may then determine 1820 whether to update the virtual network as described above. If the segmentation does determine 1820 to update the virtual network, the segmentation service may then create and/or update the virtual network 1822 by, for example, adding new segments, adding new instances, and/or rewriting the routing table for the virtual network.

The segmentation service may then determine 1824 whether the segmentation requires new instances if, for example, the segmentation is based on segmenting a virtual network associated with the application. If the segmentation service does determine 1824 that new instances are required, the segmentation service may cause a service to create 1826 the new instances and migrate one or more applications to those new instances. In an embodiment, the segmentation service may then determine 1828 whether to further segment one or more of the applications and, if the segmentation service does determine 1828 to further segment one or more of the applications, the segmentation may segment 1830 the one or more applications as described above in connection with the example process 800 illustrated in FIG. 8.

The segmentation service may then apply and evaluate the segmentation 1832. If the segmentation service determines 1834 that the segmentation is valid, the segmentation service may retain 1838 the segmentation. Conversely, if the segmentation service determines 1834 that the segmentation is not valid, then the segmentation service may discard 1836 some or all of the segmentation. In an embodiment, the segmentation service will evaluate the segmentation without applying it as described above.

Figure 19:
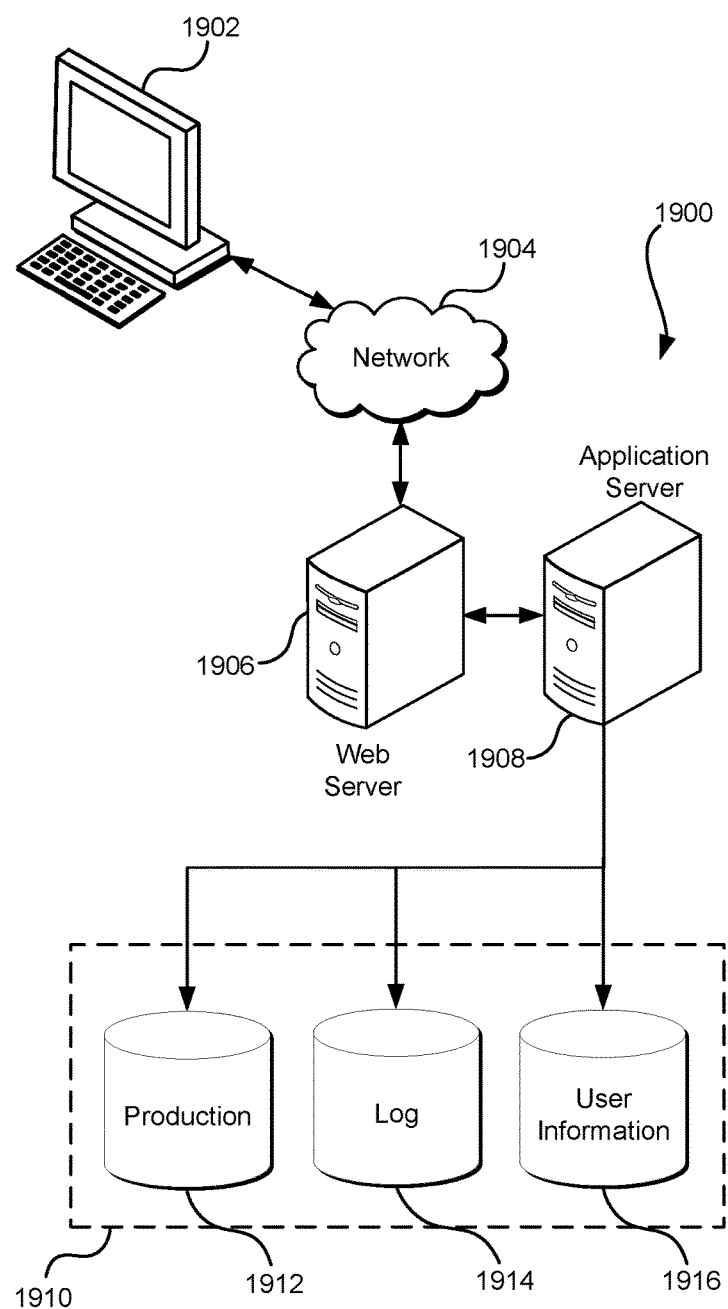
FIG. 19 illustrates an environment in which various embodiments can be implemented.

FIG. 19 illustrates aspects of an example environment 1900 for implementing aspects in accordance with various embodiments. As will be appreciated, although a web-based environment is used for purposes of explanation, different environments may be used, as appropriate, to implement various embodiments. The environment includes an electronic client device 1902, which can include any appropriate device operable to send and/or receive requests, messages, or information over an appropriate network 1904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1902 and the application server 1908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1910 can include several separate data tables, databases, data documents, dynamic data storage schemes and/or other data storage mechanisms and media for storing data relating to a particular aspect of the present disclosure. For example, the data store illustrated may include mechanisms for storing production data 1912 and user information 1916, which can be used to serve content for the production side. The data store also is shown to include a mechanism for storing log data 1914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update, or otherwise process data in response thereto.

The application server 1908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    monitoring an application to produce a set of interprocess communication event notifications associated with the application, each interprocess communication event notification specifying a corresponding communication event between a first process of a set of processes of the application and a second process of the set of processes of the application;
    monitoring the application to produce a set of external communications event notifications, each external communication event notification specifying a corresponding communication event between a third process of the set of processes of the application and an external resource;
    generating a segmentation profile for the application, the segmentation profile specifying two or more disjoint subsets of the set of processes of the application, each subset including one or more processes of the set of processes of the application;
    instantiating one or more virtual machine instances in the virtual network based at least in part on the segmentation profile;
    creating a new routing table for the virtual network based at least in part on the segmentation profile to produce a segmented virtual network; and
    migrating one or more processes of the set of processes to the one or more virtual machine instances in the segmented virtual network based at least in part on the segmentation profile.

2. The computer-implemented method of claim 1, wherein the segmentation profile is based at least in part on one or more security policies.

3. The computer-implemented method of claim 1, wherein the segmentation profile is based at least in part on one or more time periods.

4. The computer-implemented method of claim 1, wherein the segmentation profile is based at least in part on accessibility of sensitive data by the one or more virtual machine instances.

5. The computer-implemented method of claim 1, wherein the segmentation profile is based at least in part on a risk assessment of the virtual network.

6. The computer-implemented method of claim 1, wherein the segmentation profile is based at least in part on a set of preferences specified by a customer of the virtual network, the set of preferences specifying one or more changes to the segmentation profile.

7. The computer-implemented method of claim 1, wherein the virtual machine instance is a container instance that provides access to a container hosted in the container instance, the container instance providing a virtualization layer for a set of resources of the one or more computer systems.

8. The computer-implemented method of claim 1, wherein the segmentation profile specifying two or more disjoint subsets of the set of processes of the application is determined based at least in part on interprocess communication event notifications and external communications event notifications.

9. A system, comprising:
    memory storing instructions that, if executed by one or more processors of the system, cause the system to:
        obtain a set of process communication events for an application, the application including a set of processes, each process communication event specifying at least one process of the set of processes;
        generate a segmentation profile for the application based at least in part on the set of process communication events, the segmentation profile specifying two or more disjoint subsets of the set of processes, each subset including one or more corresponding processes;
        instantiate one or more new virtual machine instances, each virtual machine instance of the one or more new virtual machine instances hosting one or more subsets of the set of processes, the one or more new virtual machine instances instantiated based at least in part on the segmentation profile; and
        for each subset, update a process communication profile corresponding to each process in the subset such that communication between one or more processes not in the subset and the process is restricted.

10. The system of claim 9, wherein the set of process communication events includes a set of interprocess communication events, each interprocess communication event of the set of interprocess communications events specifying a corresponding first process of the set of processes and a corresponding second process of the set of processes.

11. The system of claim 9, wherein the set of process communication events includes a set of external process communication events, each external process communication event of the set of external process communication events specifying a corresponding first process of the set of processes and a corresponding external resource.

12. The system of claim 9, wherein the one or more virtual machine instances are in a virtual network.

13. The system of claim 12, wherein the instructions, if executed by one or more processors of the system, further cause the system to create a new routing table for the virtual network based at least in part on the segmentation profile.

14. The system of claim 9, wherein the instructions, if executed by one or more processors of the system, further cause the system to migrate one or more processes of the set of processes to the one or more new virtual machine instances based at least in part on the segmentation profile.

15. The system of claim 9, wherein the segmentation profile is based at least in part on an application profile associated with the application, the application profile specifying one or more resources associated with the application.

16. The system of claim 15, wherein the application profile specifies one or more privileges associated with the application.

17. A non-transitory computer-readable storage medium having stored thereon executable instructions that, as a result of being executed by one or more processors of a computer system, cause the computer system to at least:
  obtain a set of applications to install on one or more computer systems of a virtual network, each application of the set of applications having a corresponding application profile, each application profile specifying a corresponding one or more resources associated with the application, the set of applications including at least two applications;
  generate a segmentation profile for the set of applications, the segmentation profile specifying two or more disjoint subsets of the set of applications, each subset including a corresponding one or more applications;
  create a routing table for the virtual network based at least in part on the segmentation profile to produce a segmented virtual network; and
  install the set of applications on the one or more computer systems of the segmented virtual network based at least in part on the segmentation profile such that each computer system has a corresponding subset of the set of applications.

18. The non-transitory computer-readable storage medium of claim 17, wherein the instructions further comprise instructions that, as a result of being executed by the one or more processors, cause the computer system to:
  obtain a set of communication events, each communication event of the set of communication events specifying at least one application of the set of applications; and
  generate a new segmentation profile for the set of applications based at least in part on the set of communication events, the new segmentation profile specifying two or more subsets of the set of applications, each subset including one or more applications, each application included in at most one subset.

19. The non-transitory computer-readable storage medium of claim 17, wherein the instructions further comprise instructions that, as a result of being executed by the one or more processors, cause the computer system to:
  select one or more applications from a first subset of the set of applications;
  select one or more applications from a second subset of the set of applications;
  create a third subset of the set of applications, the third subset including the one or more applications from the first subset of the set of applications and the one or more applications from the first subset of the set of applications; and
  generate a new segmentation profile for the set of applications based at least in part on the third subset of the set of applications.

20. The non-transitory computer-readable storage medium of claim 17, wherein the instructions further comprise instructions that, as a result of being executed by the one or more processors, cause the computer system to:
  select one or more applications from a first subset of the set of applications;
  create a third subset of the set of applications, the third subset including the one or more applications from the first subset of the set of applications; and
  generate a new segmentation profile for the set of applications based at least in part on the third subset of the set of applications.

21. The non-transitory computer-readable storage medium of claim 17, wherein the instructions further comprise instructions that, as a result of being executed by the one or more processors, cause the computer system to:
  obtain a set of process communication events for an application of the set of applications, the application including a set of processes, each process communication event specifying at least one process of the set of processes; and
  generate a new segmentation profile for the application based at least in part on the set of process communication events, the new segmentation profile specifying two or more subsets of the set of processes, each subset including one or more processes, each process included in at most one subset.

22. The non-transitory computer-readable storage medium of claim 17, wherein the one or more computer systems are virtual machine instances.

23. The non-transitory computer-readable storage medium of claim 22, wherein the instructions further comprise instructions that, as a result of being executed by the one or more processors, cause the computer system to migrate one or more applications of the set of applications to the virtual machine instances based at least in part on the segmentation profile.

* * * * *